US008538786B2

(12) United States Patent
Linehan

(10) Patent No.: US 8,538,786 B2
(45) Date of Patent: Sep. 17, 2013

(54) METHOD, SYSTEM AND PROGRAM PRODUCT FOR GENERATING AN IMPLEMENTATION OF A BUSINESS RULE INCLUDING A VOLATILE PORTION

(75) Inventor: Mark H. Linehan, Yorktown Heights, NY (US)

(73) Assignee: International Business Machines Corporation, Armonk, NY (US)

(*) Notice: Subject to any disclaimer, the term of this patent is extended or adjusted under 35 U.S.C. 154(b) by 1939 days.

(21) Appl. No.: 11/448,295

(22) Filed: Jun. 7, 2006

(65) Prior Publication Data
US 2007/0288412 A1 Dec. 13, 2007

(51) Int. Cl.
*G06Q 10/00* (2012.01)
(52) U.S. Cl.
USPC .......................................................... 705/7.11
(58) Field of Classification Search
USPC .......................................................... 705/7.11
See application file for complete search history.

(56) References Cited

U.S. PATENT DOCUMENTS

| | | | |
|---|---|---|---|
| 5,809,297 A | 9/1998 | Kroenke et al. | |
| 6,314,415 B1* | 11/2001 | Mukherjee | 706/47 |
| 6,609,132 B1 | 8/2003 | White et al. | |
| 6,618,732 B1 | 9/2003 | White et al. | |
| 6,618,733 B1 | 9/2003 | White et al. | |
| 6,865,566 B2 | 3/2005 | Serrano-Morales et al. | |
| 6,965,889 B2* | 11/2005 | Serrano-Morales et al. | 1/1 |
| 7,020,869 B2* | 3/2006 | Abrari et al. | 717/108 |
| 7,451,148 B2* | 11/2008 | Childress et al. | 1/1 |
| 7,499,850 B1* | 3/2009 | Neubauer et al. | 704/9 |
| 7,577,904 B1* | 8/2009 | Obilisetty | 715/234 |
| 7,603,358 B1* | 10/2009 | Anderson et al. | 1/1 |
| 7,610,575 B2* | 10/2009 | Sproule | 717/103 |
| 7,613,666 B1* | 11/2009 | Baisley | 706/20 |
| 7,613,676 B2* | 11/2009 | Baisley et al. | 706/57 |
| 7,650,296 B1* | 1/2010 | Brunner et al. | 705/27 |
| 7,676,387 B2* | 3/2010 | Childress et al. | 705/4 |
| 7,769,769 B2* | 8/2010 | Rasmussen | 707/756 |
| 7,774,751 B2* | 8/2010 | Zhuk | 717/120 |
| 7,930,293 B2* | 4/2011 | Fox et al. | 707/713 |
| 8,050,907 B2* | 11/2011 | Baisley et al. | 704/9 |
| 2002/0049715 A1 | 4/2002 | Serrano-Morales et al. | |
| 2002/0120917 A1* | 8/2002 | Abrari et al. | 717/110 |
| 2003/0187743 A1 | 10/2003 | Kumaran et al. | |
| 2004/0030421 A1* | 2/2004 | Haley | 700/49 |
| 2004/0249645 A1 | 12/2004 | Hauser et al. | |

(Continued)

OTHER PUBLICATIONS

"Semantics of Business Vocabulary and Business Rules (SBVR)". Aug. 22, 2005. the Business Rules Team. Version 8. Document BEI/Aug. 1, 2005.*

(Continued)

*Primary Examiner* — Romain Jeanty
(74) *Attorney, Agent, or Firm* — Steven M. Greenberg, Esq.; Carey Rodriguez, Greenberg & O'Keefe

(57) ABSTRACT

A method, apparatus and computer-usable medium for implementing business rules. According to one embodiment, a computer-implementable method includes receiving one or more business rules for an upper level business model, enabling designation of at least a portion of a particular business rule among the one or more business rules as volatile, and transforming the business rules to generate implementation code for the business process modeled by the upper layer business model. The transforming includes automatically generating implementation code by which the portion of the particular business rule is configurable at runtime.

30 Claims, 12 Drawing Sheets

(56) References Cited

U.S. PATENT DOCUMENTS

| | | | |
|---|---|---|---|
| 2005/0010456 | A1 | 1/2005 | Chang et al. |
| 2005/0091093 | A1 | 4/2005 | Bhaskaran et al. |
| 2005/0096959 | A1* | 5/2005 | Kumar et al. .................... 705/8 |
| 2005/0108680 | A1 | 5/2005 | Cheng et al. |
| 2005/0192916 | A1 | 9/2005 | Serrano-Morales et al. |
| 2005/0246157 | A1 | 11/2005 | Baisley et al. |
| 2005/0246371 | A1 | 11/2005 | Baisley et al. |
| 2006/0025987 | A1 | 2/2006 | Baisley et al. |
| 2006/0026576 | A1 | 2/2006 | Baisley et al. |

OTHER PUBLICATIONS

"Semantics of Business Vocabulary and Business Rules (SBVR)". Mar. 2006. Object Management Group. Interim Convenience Document. Document DTC/Jun. 3, 2002.*

"Defining Business Rules—What Are They Really?". Jul. 2000. the Business Rules Group. Final Report, revision 1.3.*

Gottesdiener, Ellen. "Business RULES Show Power, Promise". Mar. 1997. Application Development Trends. vol. 4, No. 3.*

Ross, Ronald G. "Business Rule Solutions—What Exactly is a Business Rule?". Oct. 2005.*

Steinke, Gerhard; Nickolette, Colleen. "Business Rules as the Bssis of an Organization's Information Systems". 2003. Industrial Management & Data Systems. vol. 2003, Issue 1. pp. 52-63.*

"Business Semantics of Business Rules Request for Proposal". Jul. 22, 2003. Object Management Group. OMG Document br/Jun. 3, 2003.*

Schacher, Markus. "KnowFuture 2004—The Business Rules Approach: Beyond MDA". 2004. KnowGravity Inc.*

Michiels, Cindy; Snoeck, Monique; Lemahieu, Wilfried; Goethals, Frank; Dedene, Guido; "A Layered Architecture Sustaining Model-Driven and Event-Driven Software Development". 2003. Springer-Verlag Berlin Heidelberg. pp. 58-65.*

"Supporting the OMG Model Driven Architecture (MDA) for Service and Component Based Development". 2004. Select Business Solutions, Inc.*

P. Nandi & S. Kumaran; "Adaptive Business Objects, A New Component Model for Business Integration"; IBM TJ Watson Research Center, Yorktown Heights, NY; 10 pgs.

J. Koehler, R. Hauser, S. Kapoor, F. Wu & S. Kumaran; "A Model-Driven Transformation Method"; IBM Zurich Research Laboratory, Switzerland, IBM T.J. Watson Research Center, Yorktown Heights, NY; 12 pgs.

Stan Hendryx; "Are System Requirements Business Rules?"; SBVR & MDA; http://www.brcommunity.com/b253.php; A BPT Column; 2005; 3pgs.

A. Nigam & N. S. Caswell; "Business Artifacts: An Approach to Operational Specification"; IBM Systems Journal; vol. 42, No. 3; 2003; 20 pgs; http://www.research.ibm.com/journal/sj/423/nigam.html.

"Semantics of Business Vocabulary & Business Rules (SBVR); W3C Workshop on Rule Languages for Interoperability"; Position paper by the Business Rules Team; Mar. 18, 2005; 6 pgs.

"Unified Modeling Language: Superstructure"; Version 2.0; formal/May 7, 2004; Aug. 2005; Object Management Group; pp. i-x.

"Object Constraint Language"; OMG Available Specification; Version 2.0; formal/Jun. 5, 2001; May 2006; Object Management Group; pp. i-v.

R. Ross; "How Rules and Processes Relate"; 3 pgs; copyright 1997-2005; Business Rule Solutions; http://www.brcommunity.com/p-251.php.

* cited by examiner

METHOD, SYSTEM AND PROGRAM PRODUCT FOR GENERATING AN IMPLEMENTATION OF A BUSINESS RULE INCLUDING A VOLATILE PORTION

BACKGROUND OF THE INVENTION

The present invention relates in general to the field of computers and similar technologies, and in particular to software utilized in this field. Still more particularly, the present invention relates to computer-based business modeling.

The Object Modeling Group (OMG) defines three generic modeling layers, applicable to many kinds of business and information technology (IT) systems. These layers include, from highest to lowest, a Computation Independent Model (CIM) (often called a "Business Model") layer, a Platform Independent Model (PIM) layer, and a Platform Specific Model (PSM) layer. The mappings or transformations between the layers are dependent upon specific technologies.

Models at the top CIM or Business Model layer define various aspects of businesses. Such models are used to describe existing or proposed business structures (e.g., processes, organizations, rules, etc.) to business people for evaluation and decision making in the context of business transformation activities. Models at this layer say nothing about how the business structures might be actually implemented (e.g., using human versus automated processes). Models at the CIM layer can be defined utilizing a variety of techniques, including the semantics set forth in the OMG *Semantics of Business Vocabulary & Rules* (SBVR) standard, which is incorporated herein by reference.

Models at the middle PIM layer specify technical solutions independent of specific IT platforms. Often, such models are defined using the Unified Modeling Language (UML). Making such models platform-independent enables businesses to delay or change decisions regarding commitments to specific technology platforms.

Models at the bottom PSM layer extend the middle layer by adding specifics regarding implementation of the model on a particular platform. For example, a Java Platform, Enterprise Edition (J2EE)-based model might include J2EE deployment descriptors related to security, transaction management, and similar concerns. Such information is specific to J2EE when expressed in the J2EE-specified format, and aware of relevant J2EE semantics.

A typical implementation of a model would include the definition of the model at one of the three layers and, if the model is defined at other than the PSM layer, appropriate transformations of the model to obtain a PSM that can be deployed on the available IT infrastructure.

SUMMARY OF THE INVENTION

A computer-implementable method includes receiving one or more business rules for an upper level business model, enabling designation of at least a portion of a particular business rule among the one or more business rules as volatile, and transforming the business rules to generate implementation code for the business process modeled by the upper layer business model. The transforming includes automatically generating implementation code by which the portion of the particular business rule is configurable at runtime.

The computer-implementable can further include providing an interface through which a user enters the upper level business model, for example, in a structured human language or graphically.

The computer-implementable method can further include enabling designation of all of the particular business rule as volatile.

The computer-implementable method can further include restricting volatility of business rules to deontic rules.

In the computer-implementable method, the receiving step can further include receiving one or more business rules expressing at least one of a set of modalities consisting of necessity, possibility, impossibility, obligation, permission, and prohibition.

In the computer-implementable method, enabling designation of at least a portion of a business rule as volatile can include enabling designation of the portion of the particular business rule as volatile with a structured human language.

In the computer-implementable method, the portion of the particular business rule designated as volatile can comprise a noun concept.

In the computer-implementable method, the portion of the particular business rule designated as volatile can comprise a fact type.

In the computer-implementable method, automatically generating implementation code can include automatically generating implementation code to present a user interface to configure the portion of the particular business rule.

In the computer-implementable method, the one or more business rules include one or more non-volatile portions and automatically generating implementation code can include generating a textual prompt presented within the user interface from at least one non-volatile portion of the one or more business rules.

In the computer-implementable method, automatically generating implementation code can further include automatically generating implementation code to validate configuration input received at runtime for the volatile portion of the one or more business rules.

In the computer-implementable method, automatically generating implementation code can further include automatically generating implementation code to present a user interface including a prompt suggesting one or more possible configurations of a volatile portion of the one or more business rules.

A system includes a processor, a bus coupled to the processor, and a computer-usable medium embodying computer program code comprising instructions executable by the processor and configured for receiving one or more business rules for an upper level business model, enabling designation of at least a portion of a particular business rule among the one or more business rules as volatile, and transforming the business rules to generate implementation code for the business process modeled by the upper layer business model. The transformation includes automatically generating implementation code by which the portion of the particular business rule is configurable at runtime.

In the system, the instructions can be further configured for providing an interface through which a user enters the upper level business model, for example, in a structured human language or graphically.

In the system, the portion of the particular business rule designated as volatile can comprise all of the particular business rule.

In the system, the instructions can be further configured for restricting volatility of business rules to deontic rules.

In the system, the instructions can be further configured for receiving one or more business rules expressing at least one of a set of modalities consisting of necessity, possibility, impossibility, obligation, permission, and prohibition.

In the system, the instructions can be further configured for enabling designation of the portion of the particular business rule as volatile with a structured human language.

In the system, the portion of the particular business rule designated as volatile can comprise a noun concept.

In the system, the portion of the particular business rule designated as volatile can comprise a fact type.

In the system, the instructions can be further configured to automatically generate implementation code to present a user interface to configure the volatile portion of the particular business rule.

In the system, the one or more business rules can include one or more non-volatile portions, and the instructions can be further configured to generate a textual prompt presented within the user interface from at least one non-volatile portion of the one or more business rules.

In the system, the instructions can be further configured to automatically generate implementation code to validate configuration input received at runtime for the volatile portion of the one or more business rules.

In the system, the instructions can be further configured to automatically generate implementation code to present a user interface including a prompt suggesting one or more possible configurations of the volatile portion of the one or more business rules.

A computer-usable medium embodies computer program code comprising computer executable instructions configured for receiving one or more business rules for an upper level business model, enabling designation of at least a portion of a particular business rule among the one or more business rules as volatile, and transforming the business rules to generate implementation code for the business process modeled by the upper layer business model. The transformation includes automatically generating implementation code by which the portion of the particular business rule is configurable at runtime.

In the computer-usable medium, the embodied computer program code can further comprise computer executable instructions configured for providing an interface through which a user enters the upper level business model, for example, in a structured human language or graphically.

In the computer-usable medium, the instructions configured for enabling designation of at least a portion of the particular business rule as volatile can comprise instructions configured for enabling designation of all of the particular business rule.

In the computer-usable medium, the embodied computer program code can further comprise computer executable instructions configured for restricting volatility of business rules to deontic rules.

In the computer-usable medium, the computer executable instructions configured for receiving can be further configured for receiving one or more business rules expressing at least one of a set of modalities consisting of necessity, possibility, impossibility, obligation, permission, and prohibition.

In the computer-usable medium, the computer executable instructions are further configured for enabling designation of the portion of the particular business rule as volatile with a structured human language.

In the computer-usable medium, the instructions configured for enabling designation of at least a portion of the particular business rule as volatile can comprise instructions configured for enabling designation of a noun concept as volatile.

In the computer-usable medium, the instructions configured for enabling designation of at least a portion of the particular business rule as volatile can comprise instructions configured for enabling designation of a fact type as volatile.

In the computer-usable medium, the embodied computer program code can be further configured to automatically generate implementation code to present a user interface to configure the volatile portion of the particular business rule.

The one or more business rules can include one or more non-volatile portions and the embodied computer program code can be further configured to generate a textual prompt presented within the user interface from at least one non-volatile portion of the one or more business rules.

In the computer-usable medium, the embodied computer program code can be further configured to automatically generate implementation code to validate configuration input received at runtime for the volatile portion of the one or more business rules.

In the computer-usable medium, the embodied computer program code can be further configured to automatically generate implementation code to present a user interface including a prompt suggesting one or more possible configurations of the volatile portion of the one or more business rules.

The computer executable instructions can be deployable to a client computer from a server at a remote location and can be provided by a service provider to a customer on an on-demand basis.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figure 1:
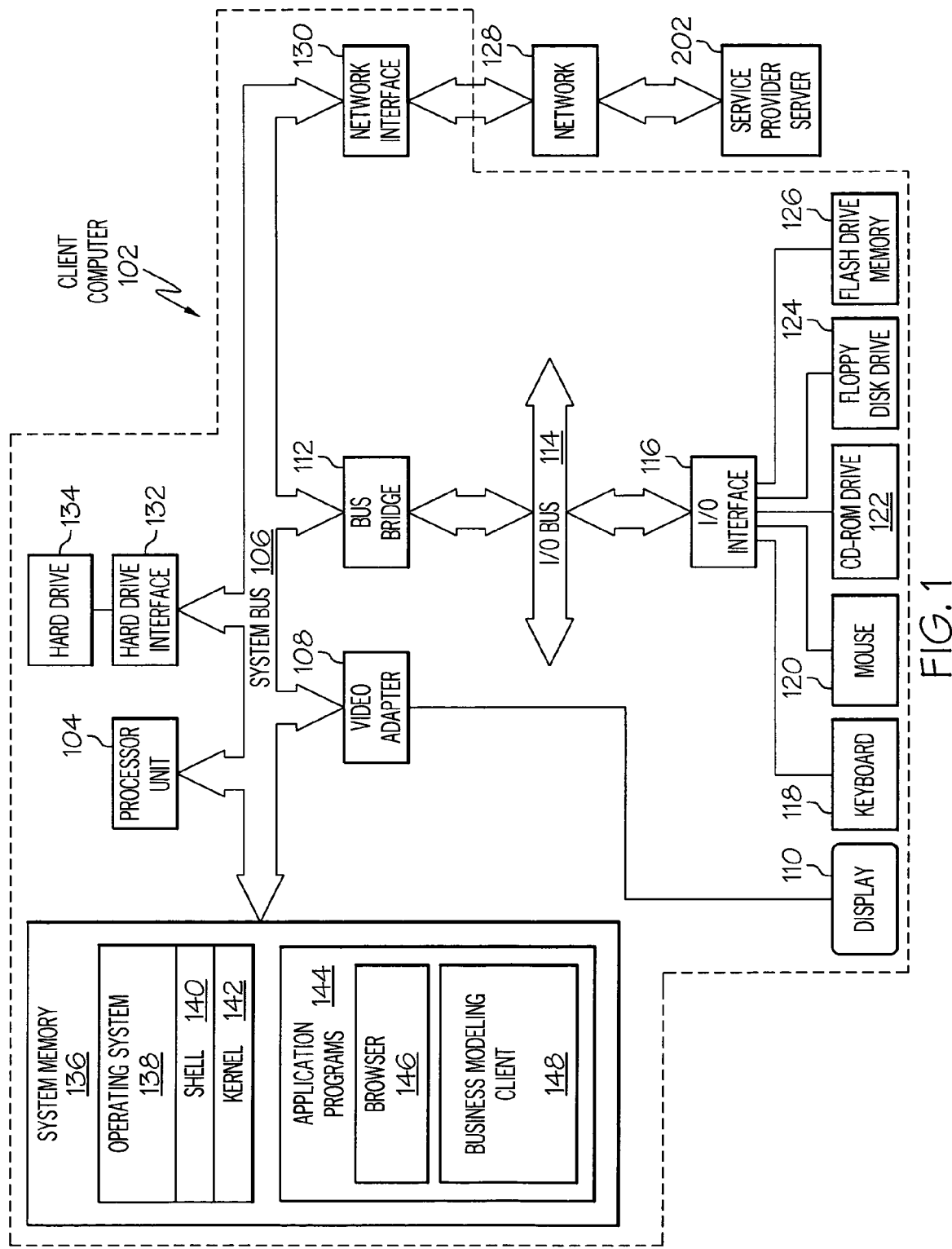
FIG. 1 depicts an exemplary client computer in which the present invention may implemented.

With reference now to FIG. 1, there is depicted a block diagram of an exemplary client computer 102, with which the present invention may be utilized. Client computer 102 includes a processor unit 104 that is coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Client computer 102 is able to communicate with a service provider server 202 via a network 128 using a network interface 130, which is coupled to system bus 106. Network 128 may be an external network such as the Internet, or an internal network such as an Ethernet or a Virtual Private Network (VPN). Using network 128, client computer 102 is able to use the present invention to access service provider server 202.

A hard drive interface 132 is also coupled to system bus 106. Hard drive interface 132 interfaces with a hard drive 134. In a preferred embodiment, hard drive 134 populates a system memory 136, which is also coupled to system bus 106. Data that populates system memory 136 includes client computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a browser 146. Browser 146 includes program modules and instructions enabling a World Wide Web (WWW) client (i.e., client computer 102) to send and receive network messages to the Internet using HyperText Transfer Protocol (HTTP) messaging, thus enabling communication with service provider server 202.

Application programs 144 in client computer 102's system memory also include business modeling client 148. Although illustrated as a single component, in some embodiments business modeling client 148 may be formed of multiple software components. As described further below, business modeling client 148 may be utilized to implement the process depicted in FIGS. 3A-3B wholly or in part. In one embodiment, client computer 102 is able to download business modeler tool 148 from service provider server 202 shown in FIG. 2, for example, via browser 146. In another embodiment, client computer 102 accesses business modeling tool 248 via browser 146. Examples of business modeling clients 148 that may be utilized in the present invention include the WebSphere Business Modeler, Rational Software Architect and Rational Software Modeler, all available from IBM Corporation of Armonk, N.Y.

The hardware elements depicted in client computer 102 are not intended to be exhaustive, but rather are representative to highlight essential components required by the present invention. For instance, client computer 102 may include alternate memory storage devices such as magnetic cassettes, Digital Versatile Disks (DVDs), Bernoulli cartridges, and the like. These and other variations are intended to be within the spirit and scope of the present invention.

Figure 2:
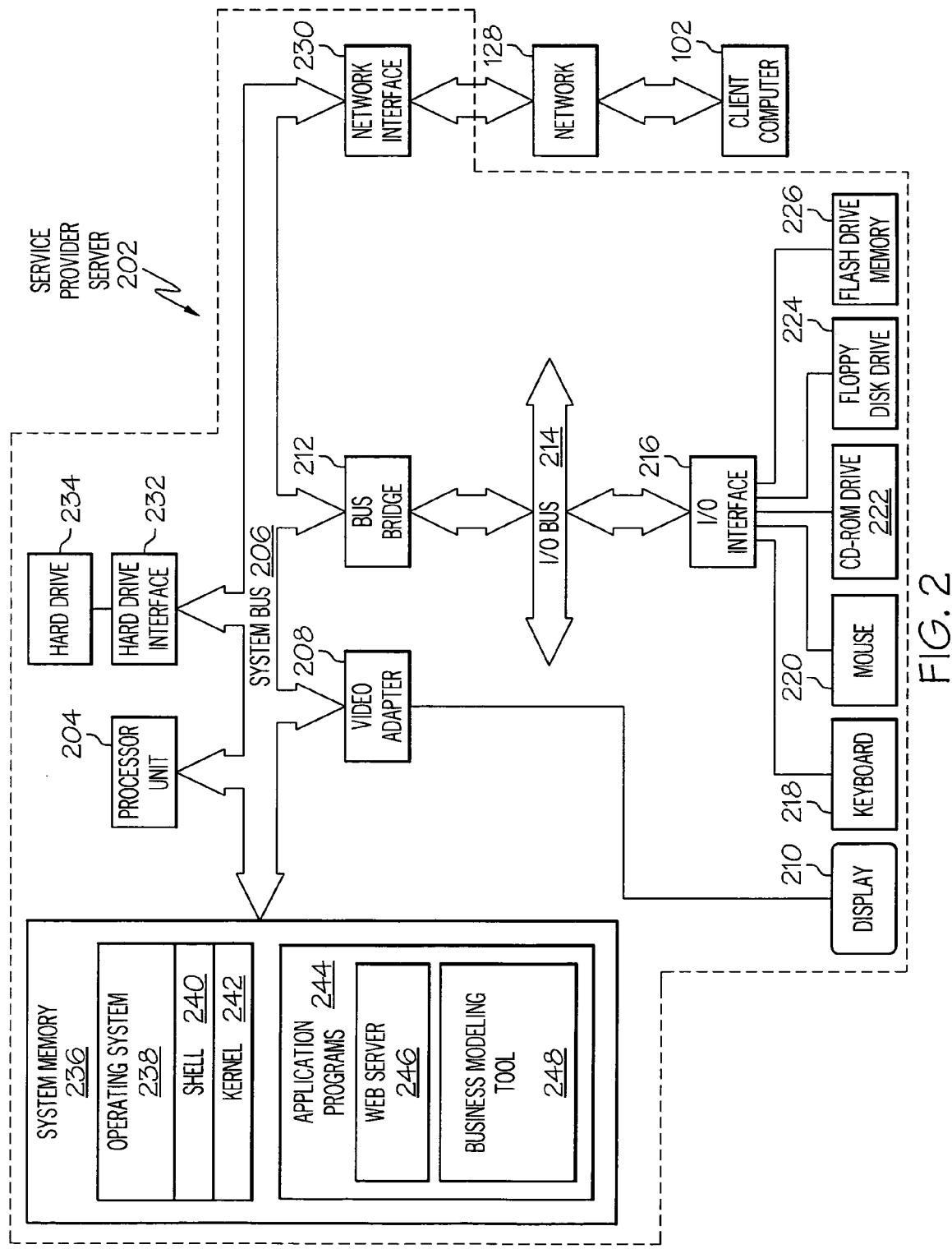
FIG. 2 illustrates an exemplary server from which software for executing the present invention may be deployed and/or implemented for the benefit of a user of the client computer shown in FIG. 1.

With reference now to FIG. 2, there is illustrated an exemplary service provider server 202 in accordance with the present invention. As shown, service provider server 202 includes a processor unit 204 that is coupled to a system bus 206. A video adapter 208 is also coupled to system bus 206. Video adapter 208 drives/supports a display 210. System bus 206 is coupled via a bus bridge 212 to an Input/Output (I/O) bus 214. An I/O interface 216 is coupled to I/O bus 214. I/O interface 216 affords communication with various I/O devices, including a keyboard 218, a mouse 220, a Compact Disk-Read Only Memory (CD-ROM) drive 222, a floppy disk drive 224, and a flash drive memory 226. The format of the ports connected to I/O interface 216 may be any known to those skilled in the art of computer architecture, including but not limited to Universal Serial Bus (USB) ports.

Service provider server 202 is able to communicate with client computer 102 via network 128 using a network interface 230, which is coupled to system bus 206. Access to network 128 allows service provider server 202 to download or deploy business modeling client 148 to client computer 102.

System bus 206 is also coupled to a hard drive interface 232, which interfaces with a hard drive 234. Hard drive 234 may conveniently store copies of business modeling client 148 and business modeling client 148 for deployment to client computer 102. In a preferred embodiment, hard drive 234 also populates a system memory 236, which is also coupled to system bus 206. Data that populates system memory 236 includes service provider server 202's operating system 238, which includes a shell 240 and a kernel 242. Shell 240 is incorporated in a higher level operating system layer and utilized for providing transparent user access to resources such as application programs 244, which include a web server 246 and business modeling tool 248. Although illustrated as a single component for clarity, in some embodiments business modeling tool 248 may be formed of multiple software components.

The hardware elements depicted in service provider server 202 are not intended to be exhaustive, but rather are representative to highlight essential components required by the present invention. For instance, service provider server 202 may include alternate memory storage devices such as flash drives, magnetic cassettes, Digital Versatile Disks (DVDs), Bernoulli cartridges, and the like. These and other variations are intended to be within the spirit and scope of the present invention.

Figure 3A:
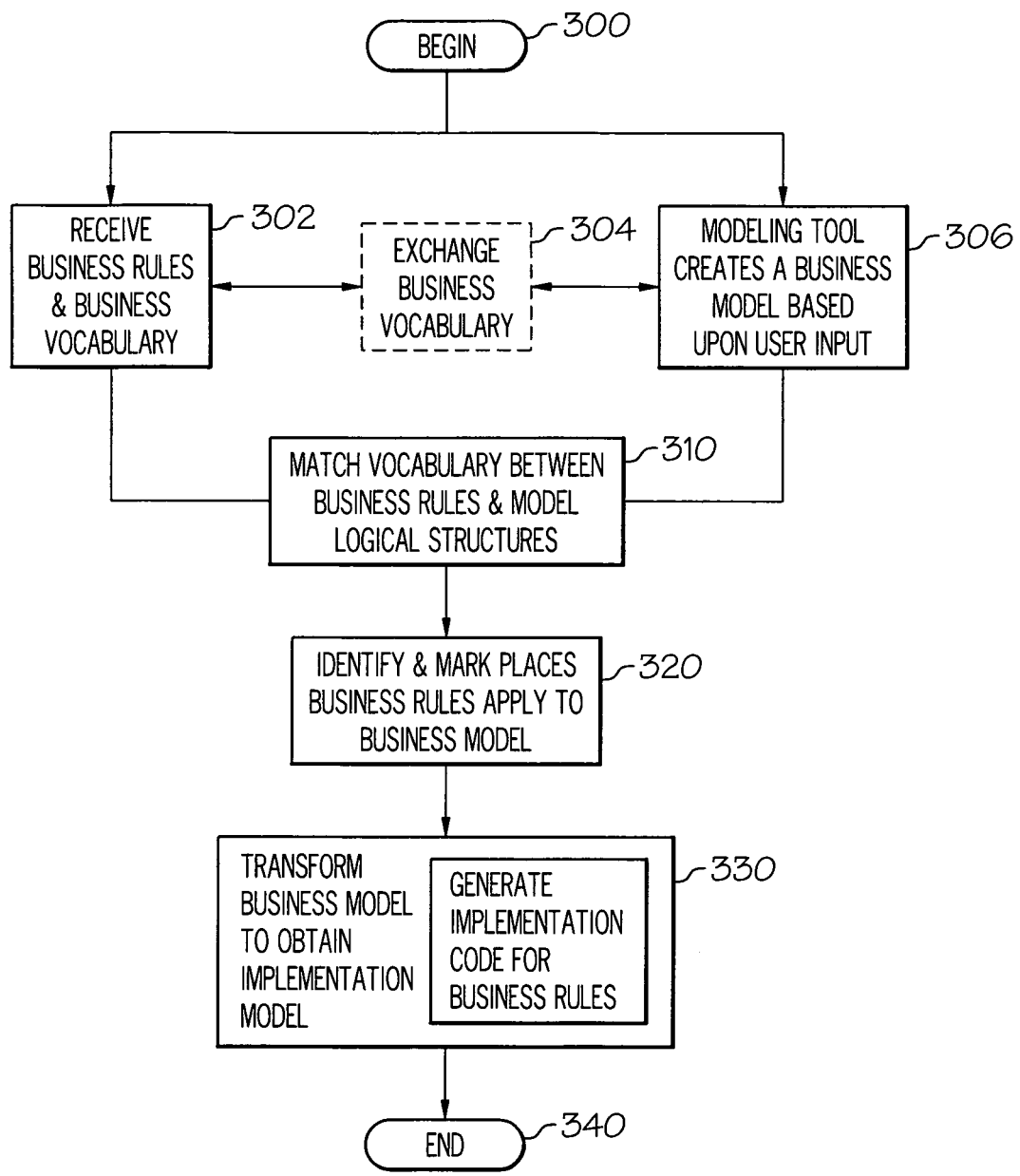
FIG. 3A is a high level logical flowchart of an exemplary process for implementing business rules for an upper layer business model in accordance with the present invention.
Figure 3B:
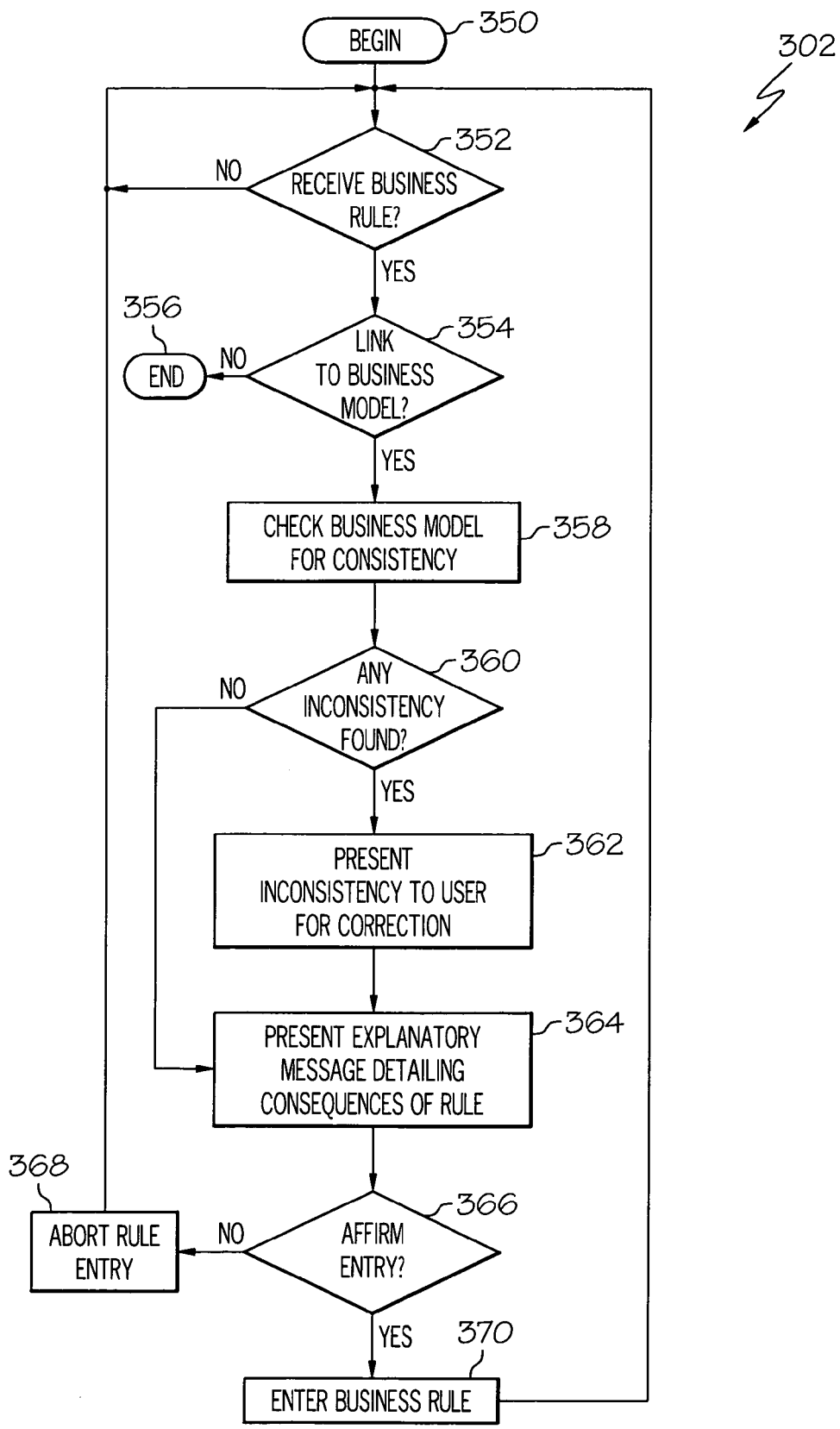
FIG. 3B is a more detailed flowchart of an exemplary process by which a business modeling tool can explain the impact of proposed business rules and flag inconsistencies of an entered business rule with an upper layer business model in accordance with the present invention.

Note further that, in one preferred embodiment of the present invention, business modeling client 148 on client computer 102 accesses business modeling tool 248 in order to perform the steps depicted in FIGS. 3A-3B. In an alternative preferred embodiment of the present invention, business modeling tool 248 may be accessed from client computer 102 via browser 146. In yet another preferred embodiment, service provider server 202 performs all of the functions associated with the present invention utilizing business modeling tool 248, thus freeing client computer 102 from using its resources.

As described above, the Object Modeling Group (OMG) defines three generic modeling layers, applicable to many kinds of business and information technology (IT) systems. These layers include, from highest to lowest, a Computation Independent Model (CIM) (often called a "Business Model") layer, a Platform Independent Model (PIM) layer, and a Platform Specific Model (PSM) layer.

For PSM layer models, business rules have conventionally been defined using if-then statements, decision tables, decision trees, or similar forms. Such business rules govern the execution steps performed by an implementation of the PSM model when presented with specific input and may include or imply a consequence if the business rule is broken. In general, PSM business rules are conventionally directly implemented utilizing a mathematical formula and/or an if-then-else construct and are associated by IT personnel with specific steps in an implementation via a user interface.

The present invention recognizes that it would be useful and desirable to improve the implementation of business rules for a model of a business process, for example, by supporting the definition of business rules at an upper layer utilizing semantics and syntax that business persons can readily apprehend. Accordingly, the present invention supports the definition of business rules at a selected upper layer, for example, the Business Model layer or Platform Independent Model (PIM) layer, preferably utilizing natural human language and/or a graphical user interface.

The rule semantics at the Business Model layer concern obligation, permission, or prohibition regarding conduct, action, practice, or procedure within a particular activity or sphere. For example, a current U.S. government regulation forbids most commercial dealings with specified foreign countries. Such regulations are statements of prohibition. Business Model layer rule semantics may also include statements of necessity, possibility, or impossibility concerning business design. For example, "every order always has one customer" is a statement of necessity. The remainder of the business model is also defined at the selected upper layer. The remainder of the business model and business rules are then linked, so that when the business model is transformed to obtain a more implementation-oriented model at a lower layer the transformation yields one or more PIM or PSM layer rules applicable to the implementation-oriented business model.

Referring now to FIG. 3A, there is depicted a high level logical flowchart of an exemplary process by which business rules may be implemented at an upper layer of the business modeling hierarchy in accordance with the present invention. For clarity, the process of FIG. 3A is described with reference to operations of business modeling client 148 of client computer 102 of FIG. 1; however, it should be recognized that some or all of the illustrated operations may be performed by business modeling tool 248 as hereinbefore described.

As shown in FIG. 3A, the process begins at block 300 and then proceeds to each of blocks 302 and 306, which may be performed concurrently or in any sequence. Block 302 depicts business modeling client 148 receiving as input a set of business rules and associated business vocabulary in terms of which the business rules are defined. Either or both of the rules and the vocabulary may be expressed either textually (e.g., as a structured form of a natural human language), graphically, or as a combination of graphical and textual expression. Business modeling client 148 further creates a representation of a business process flow or business state machine and associated business items or class model at an upper layer (i.e., the CIM layer or PIM layer) based upon user input at block 306. The business model, which includes the business rules, vocabulary, and flow or state machine can be expressed in the user interface, for example, graphically and/or textually, and may be represented in memory 136 or hard drive 134 utilizing various data structures. As indicated at block 304 by dashed line illustration, the business vocabulary can, but need not be exchanged between the business rule entry process depicted at block 302 and the business item or class model creation process illustrated at block 306 such that some or all of the business vocabulary employed in the business rules and business item or class model are common to both.

Figures 4A, 4B:
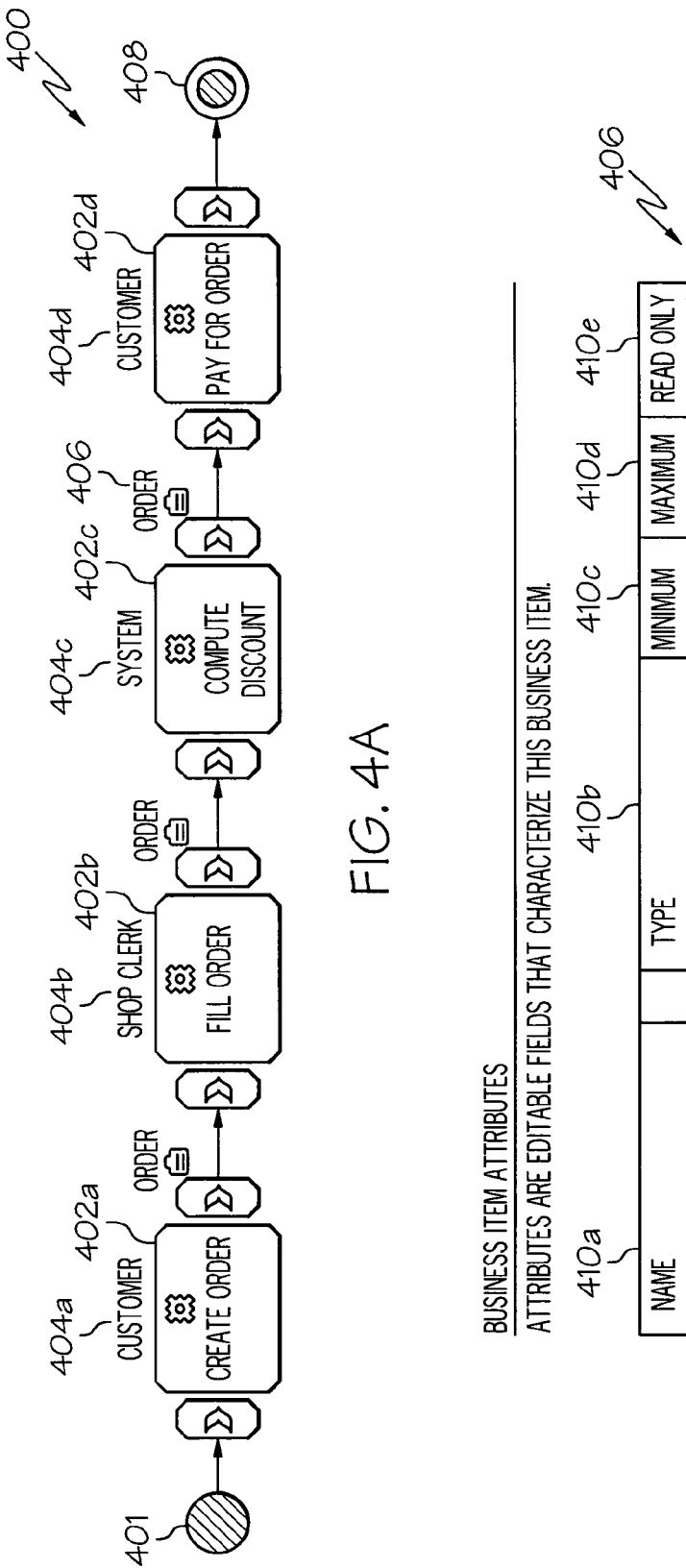
FIG. 4A depicts a first graphical representation of a business model generated utilizing a business modeling tool in accordance with the present invention.
FIG. 4B illustrates a graphical representation of a business item of a business model generated utilizing a business modeling tool in accordance with the present invention.
Figure 5A:
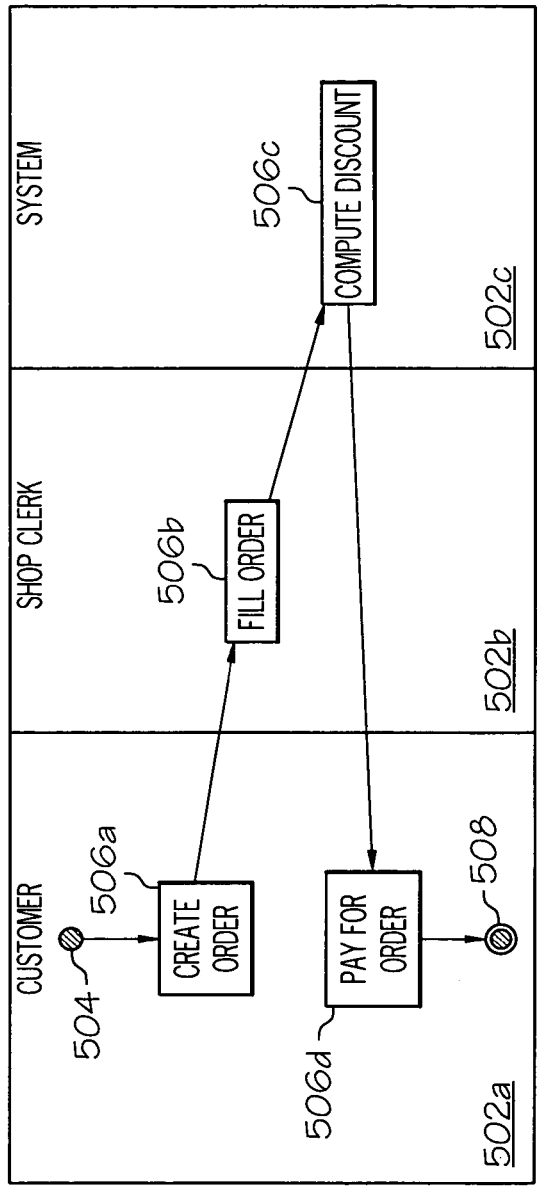
FIG. 5A depicts a second graphical representation of a business model generated utilizing a business modeling tool in accordance with the present invention.
Figure 5B:
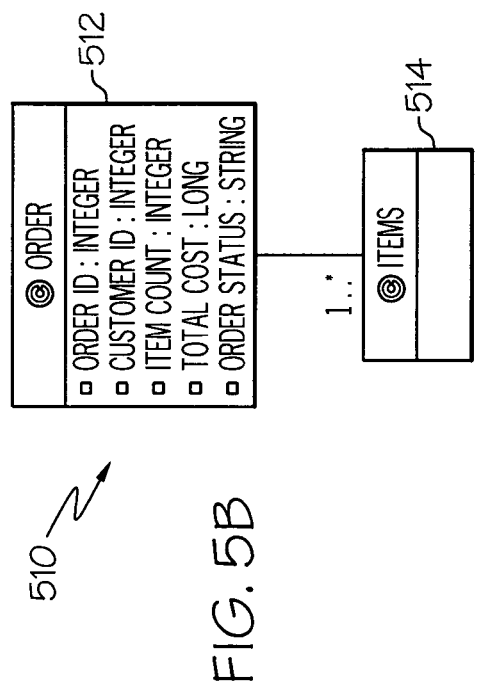
FIG. 5B illustrates a graphical representation of a business item of a business model generated utilizing a business modeling tool in accordance with the present invention.
Figure 5C:
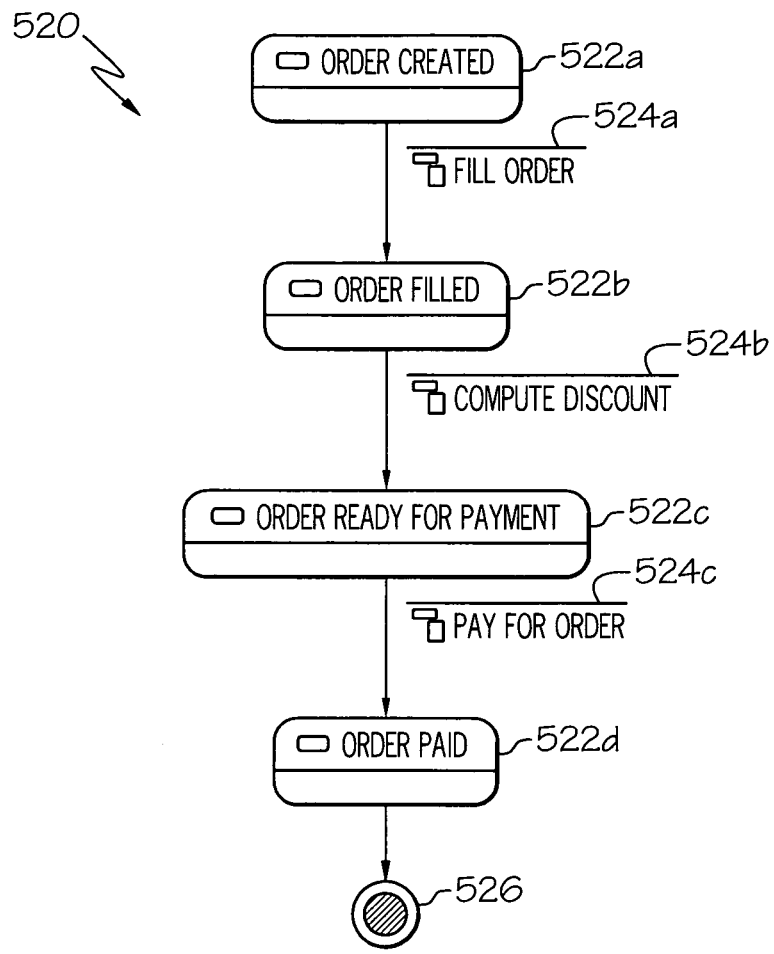
FIG. 5C depicts a third graphical representation of a business item of a business model generated utilizing a business modeling tool in accordance with the present invention.

At block 306, the business model can be defined at a selected upper level of the modeling hierarchy utilizing any one of a number of currently available or future developed modeling tools, and can be represented using various diagram formats such as work flows (FIG. 4A), business items (FIG. 4B), UML activity diagrams (FIG. 5A), UML class diagrams (FIG. 5B), UML state diagrams (FIG. 5C). For example, the business modeling client 148 may be implemented with WebSphere Business Modeler to permit modeling of the business process at the Business Model layer. Business modeling client 148 may alternatively or additionally be implemented with the IBM Rational Software Architect or Rational Software Modeler to support modeling of business processes at the PIM layer.

With reference now to FIG. 4A, there is illustrated an exemplary graphical representation of a basic business process work flow 400 at the Business Model layer, which may be created utilizing business modeling client 148. For example, a human user may graphically assemble business model 400 utilizing well-known techniques by interacting with a graphical user interface presented by business modeling client 148 within display 110. As illustrated, business model 400 begins at an origin point 401, passes through a number of different tasks 402a-402d, and ends at a termination point 408. Tasks 402 represent individual steps within the modeled business process and include creating an order 406 (task 402a), filling the order (task 402b), computing a discount (task 402c), and paying for the order (task 402d).

Various user roles may also be associated within business model 400 with one or more tasks 402. For example, in the illustrated example, tasks 402a and 402d are associated with Customer role 404a, task 402b is associated with Store Clerk role 404b, and task 402c is associated with System role 404c.

As previously noted with reference to order 406, business models, such as business model 400, may create, modify and store various business items defining business data relevant to the business process. As shown in FIG. 4B, business modeling client 148 may further permit a user to view and/or modify attributes of a business item, such as order 406. In the illustrated embodiment, the attributes of order 406 are displayed in a tabular format in which each attribute has an associated entry comprising a name field 410a, attribute type field 410b, minimum value field 410c, maximum value field 410d and read-only field 410e.

FIG. 5A illustrates that the business model generated utilizing business modeling client 148 may alternatively be created at the PIM layer as a Unified Modeling Language (UML) Activity Model 500. In this embodiment, business modeling client 148 is configured to permit the user to construct partitions (or "swimlanes") 502a, 502b and 502c to respectively represent the user roles of Customer, Store Clerk and System. Execution steps within the modeled business process are then assigned to user roles by placing each of tasks 506a-506d within the appropriate ones of swimlanes 502a-502c. Lines connecting the actions indicate the required action sequence. For example, following the same association between tasks and roles described in FIG. 4A, create order task 506a and pay for order task 506d are placed within the swimlane 502a associated with the Customer role, fill order task 506b is placed within the swimlane 502b associated with the Store Clerk role, and compute discount task 506c is placed within the swimlane 502c associated with the System role.

As depicted in FIG. 5B, items of business data are defined for UML business model 500 utilizing class diagrams, such as class diagram 510. In particular, class object 514, representing the class of business items, is shown to have a relationship with a class named Order, which is presented by class object 512. Properties of the class Order, for example, Order ID, Customer ID, Item Count, Total Cost and Order Status, and associated property types are presented within class object 512.

FIG. 5C depicts an alternative state diagram expression of an UML business model 520 equivalent to that depicted in FIG. 5A. UML state diagrams like that depicted in FIG. 5C focus on the lifecycle of objects (e.g., orders) as defined by explicit states the objects may take on, where a state is defined as a condition or situation during the life of an object during which it satisfies some condition, performs some do activity, or waits for some event. A UML event, in turn, is defined as a type of noteworthy occurrence that has a location in time or space and can cause execution of actions, such as progression of an object between lifecycle states.

Thus, in the illustrated example, the states of an order include Order Created state 522a, Order Filled state 522b, Order Ready for Payment state 522c, and Order Paid state 522d. The order transitions from Order Created state 522a to Order Filled state 522b in response to Fill Order event 524a, transitions from Order Filled state 522b to Order Ready for Payment state 522c in response to Compute Discount event 524b, and transitions from Order Ready for Payment state 522c to Order Paid state 522d in response to Pay for Order event 524c. Thereafter, the lifecycle of the order terminates at termination point 526.

While the examples given in FIGS. 4A-4B and 5A-5C model a simple business process, such as the purchase of an order in a retail trade, those skilled in the art will appreciate that the described modeling technique are broadly applicable to all types of businesses including agriculture, mining, construction, manufacturing, communications, transportation, wholesale trade, finance (e.g., credit scoring of consumers), manufacturing, insurance, and real estate, business and personal services, public administration, etc.

As is apparent from FIGS. 4A-4B and 5A-5C, the meaning of the structural relationships of the business models rests upon the underlying business vocabulary, which is defined herein as meaning a set of symbols and forms of expression that express concepts within a body of shared meanings. In an exemplary embodiment of the present invention that complies with the *Semantics of Business Vocabulary and Rules* (SBVR) specification promulgated by OMG, the business vocabulary employed at blocks 302, 304 and/or 306 includes a number of classes of semantics, including noun concepts, individual concepts, fact types, verbs, and keywords. A noun concept is defined by the SBVR specification as a concept that is not a fact type. A noun concept may also be referred to as an "object type" or a "class". Examples of noun concepts include product, forecast, and forecaster. Noun concepts may be distinguished from other semantics by single underlining.

An individual concept is a concept that corresponds to only one object or thing. An individual concept may also be referred to as an "instance". Examples of individual concepts include product number 1234 or forecaster Bill, where product and forecaster are noun concepts and number 1234 and Bill are individual concepts. Individual concepts may be distinguished from other semantics by double underlining.

A fact type states an attribute of a noun concept or a relationship among multiple noun concepts. A fact type may also be referred to as an attribute of a single class or an association between classes. Examples of fact types include:
 forecast is published
 forecaster creates forecast
It should be noted in these examples of fact types that verbs, which are identified by italics, are utilized to express the possession of the attribute by the noun concept or relation between noun concepts. Moreover, the noun concepts identified within a fact type take on roles (e.g., forecast, published, forecaster). Each such role is of at most one fact type.

To allow some flexibility in terminology, it is desirable if synonyms are supported, that is, the business vocabulary allows multiple terms for a single concept (e.g., automobile and car). It is also desirable that the syntax is flexible enough to permit synonymous forms, that is, multiple ways to state a single fact type. For example, both "person drives car" and "car is driven by person" are acceptable expressions of the same fact type.

The SBVR specification employs a number of keywords to indicate various concepts defined in formal logic. A first type of keyword, summarized in TABLE I below, expresses quantification of noun concepts defined in an SBVR vocabulary.

TABLE I

| Keyword | Signification |
| --- | --- |
| each | universal quantification |
| some | existential quantification |
| at least one | existential quantification |
| at least n | at-least-n quantification |
| at most one | at-most-one quantification |
| at most n | at-most-n quantification |
| exactly one | exactly-one quantification |
| exactly n | exactly-n quantification |
| at least n and at most m | numeric range quantification |
| more than one | at-least-n quantification with n = 2 |

In TABLE I, universal quantification ("each") refers to all instances of something, and existential quantification ("some") refers to particular instances of something.

The SVBR specification also sets forth keywords utilized to define standard logical operators, as summarized in TABLE II below.

TABLE II

| Keyword | Signification |
|---|---|
| it is not the case that p | logical negation |
| p and q | conjunction |
| p or q | disjunction |
| p or q but not both | exclusive disjunction |
| if p then q | implication |
| q if p | implication |
| p if and only if q | equivalence |
| not both p and q | NAND formulation |
| neither p nor q | NOR formulation |
| p whether or not q | whether-or-not formulation |

Keywords are distinguished herein by bold face type.

According to the present invention, the business vocabulary can be defined in a number of different ways. For example, the user can begin by creating the upper layer business items or class model at block 306, and business modeling client 148 can automatically create the business vocabulary from aspects of the model. In this vocabulary definition methodology:

1. the business items (or UML classes and properties) become business vocabulary terms;
2. business item and UML class properties become "has" or "is" fact types;
3. user roles become business vocabulary terms; and
4. task names become verbs (fact type designators).
5. UML associations become fact types.

If desired, synonyms and synonymous forms can be defined by the user or inferred by business modeling client 148 to create "business friendly" versions of programmer labels.

Alternatively or additionally, the business vocabulary can be defined prior to creation of the business items and class model and can be utilized by business modeling client 148 to automatically create some or all of the business items or classes. In this embodiment:

1. Terms become Business Items or UML classes;
2. "Has" and "is" fact types define properties (attributes) of Business Items or UML classes; and
3. Other fact types define UML associations.

Referring again to block 302, the business rules defined therein can generally be classified as one of two types: alethic and deontic. Alethic business rules, also referred to as structural or definitional business rules, state what is necessary or possible or impossible. For example, an alethic business rule may be stated as "It is necessary that every person has exactly two natural parents." Alternatively, this same alethic rule may be stated as "Each person always has exactly two natural parents." Another example of an alethic rule is "It is possible that a person's parents may be unknown." Yet another alethic rule may be stated as "It is impossible that a person has more or less than two natural parents.", or alternatively, "Each person never has more than two or less than two natural parents."

Deontic (also called operative or behavioral) business rules state what is obligatory or permitted or prohibited and may have enforcement levels. For example, a deontic rule may be "It is obligatory that each person have at most one spouse at a time.", or alternatively, "each person must have at most one spouse at a time." Another example of a deontic rule is "It is permitted that a person have one spouse at a time.", or alternatively, "each person may have one spouse at a time." Stated as a prohibition, this deontic rule may be stated as "It is prohibited that a person have more than one spouse at a time.", or alternatively, "a person may not have more than one spouse at a time." IETF RFC 2119 gives a set of definitions for some deontic terms and is incorporated herein by reference.

As noted above, a deontic business rule may have an associated enforcement level, which is defined herein as "a graded or ordered scale of values that specifies the severity of action imposed in order to put or keep an operative business rule in force." SBVR standard, section 12.1.3. For example, if the available enforcement levels are "pay a fine" or "go to jail", the deontic rule "a person may not have more than one spouse at a time" might have an associated enforcement level of "go to jail".

As can be discerned from the exemplary rules set forth above, alethic and deontic business rules have a number of possibly modalities. The possible modality types and exemplary business rules employing each modality type are given below in TABLE III.

TABLE III

| Type | Business Rule |
|---|---|
| necessity | Every order always *has* exactly one customer. |
| restricted necessity | It is necessary that a customer *has* at least one order only if the given customer *has paid*. |
| possibility | It is possible that a customer *has* more than one order. |
| restricted possibility | It is possible that a customer *has* more than one order only if at most one order *is open*. |
| impossibility | An order never *has* more than one payment. |
| obligation | A customer must *pay for* each order that *is completed*. |
| restricted obligation | A customer must *pay for* each *completed* order if the customer *is* not a free prize winner. |
| permission | A customer may *pay with* a credit card. |
| restricted permission | A customer may *pay with* a credit card only if the total cost *of* an order *is more than* $10. |
| prohibition | A customer must not *pay* tips. |

In TABLE III, noun concepts are underlined, verbs are italicized and keywords employ boldface type.

One principle that can be observed from the exemplary rules set forth in TABLE III is that rules apply modality claims (e.g. always, never, must, may, must not, etc.) to fact types. The fact type underpinning the rules can be automatically detected and recorded by business modeling client 148. The fact types within the exemplary business rules are set forth below in TABLE IV.

TABLE IV

| Business Rule | Fact Type(s) |
|---|---|
| Every order always *has* exactly one customer. | order *has* customer |
| It is necessary that a customer *has* at least one order only if the given customer *has paid*. | customer *has* order<br>customer *has paid* |
| It is possible that a customer *has* more than one order. | order *has* customer |
| It is possible that a customer *has* more than one order only if at most one order *is open*. | order *has* customer<br>order *is open* |
| An order never *has* more than one payment. | order *has* payment<br>payment is the noun form of customer pays for order |
| A customer must *pay for* each order that *is completed*. | customer *pays* for order<br>order *is* completed |
| A customer must *pay for* each *completed* order if the customer *is* not a free prize winner. | customer *pays for* order<br>customer *is* free prize winner |
| A customer may *pay with* a credit card. | customer *pays for* order *with* a credit card |

TABLE IV-continued

| Business Rule | Fact Type(s) |
| --- | --- |
| A customer may pay with a credit card only if the total cost of an order is more than $10. | customer pays for order with a credit card<br>order has total cost<br>total cost is more than dollar value |
| A customer must not pay tips. | customer pays tips |

According to the present invention, business rules may optionally be restricted in application by specified conditions. Examples of types of restrictive conditions are set forth in TABLE V.

TABLE V

| Condition type | Meaning | Example |
| --- | --- | --- |
| restricted obligation form | obligation exists only if some condition is satisfied | income tax must be paid only if ordinary income is greater than $30,000 |
| restricted necessity form | necessity exists only if some condition is satisfied | it is necessary that Elvis breathes, only if Elvis is alive |
| restricted permissive form | permission exists only if some condition is satisfied | persons may marry only if they are of marriageable age |
| restricted possibility form | possibility exists only if some condition is satisfied | it is a possibility that person A is a parent of person B only if they share certain DNA components |

Other forms of restricted conditions such as "restricted impossibility" and "restricted prohibition" forms can be utilized, but such forms generally produce double negatives. In general, it is preferred if restricted impossibility and restricted prohibition forms are restated by business modeling client 148 in one of the "positive restriction" forms given above. For example, the restricted permission statement "persons may marry only if they are of marriageable age" could be given in the following restricted prohibition form: "persons are forbidden to marry if they are not of marriageable age." This deontic rule is equivalent to "persons may not marry if they are not of marriageable age", which includes an undesirable double negative.

As described in Annex F.1.2 of the SBVR specification, a special computational form of restricted condition can be stated. In the computation form, the keyword "is to be computed as" indicates a computation formula having the modality of necessity. For example:

Discount is to be computed as 10% of the total.

The rule can alternatively be stated with keyword "must be computed as" to indicate the modality of behavioral obligation. For example:

Discount must be computed as 10% of the total.

Referring again to block 302 of FIG. 3A, the business rules can be entered into business modeling client 148 utilizing one or more of a number of different methods. First, the business rules can be entered by the user textually utilizing a structured natural human language. An exemplary implementation of a system (e.g., a language parser, expression model generator and logical model generator) that supports entry of business rules in structured natural human language is described in U.S. Patent Application Publication US20060025987A1, which is incorporated herein by reference. The logical model generator of the system generates a logical model of the business rules.

Second, business modeling client 148 may support entry of the business rules utilizing a wizard. In this case, parsing is not necessary because the user interacts with various computer-based forms, rather than creating plain text. Expression generation is performed by business modeling tool 148 in accordance with the choices made by the user as he or she interacts with the wizard. Business modeling tool 148 then creates a logical model of the business rules as the user explicitly identifies relationships between noun concepts (e.g., synonyms) and the noun concepts that play roles in fact types.

Third, the business rules may be entered by importing into business modeling client 148 business rules contained in XML files encoded in XML Metadata Interchange (XMI) format specified in the SBVR standard. In this case, parsing is not necessary, and the expressions are encoded directly in the XML. A logical model of the business rules can then be formed as described in U.S. Patent Application Publication US20060025987A1.

Referring again to FIG. 3A, following the entering of at least one business rule at blocks 302 and the creation of a business rule at 306, business modeling client 148 matches the business vocabulary in the business rules entered at block 302 to the business items, classes, and user roles in the upper layer business model entered at block 306, as shown at block 310. The matching depicted at block 310 includes business modeling client 148 matching noun concepts, e.g. order, customer, credit card, payment, etc., between the business rules and upper layer business model. In addition, business modeling client 148 matches verbs in the business rules to the tasks present within the upper layer business model and matches verbs that indicate incorporation (e.g., has, have, is of) to properties or attributes of business items or classes. In performing the matching, business modeling client 148 can employ actual lexical matching as well as employ dictionary or rule-based variant matching to identify plural and passive forms. The matching can further take into account synonyms and synonymous forms identified by the user. Business modeling client 148 records matching information, for example, within a data structure in system memory 136 or hard drive 134.

Following the matching performed at block 310, business modeling client 148 identifies and marks locations in the upper layer business model that may be affected by a business rule, as depicted at block 320. In general, each business rule at the upper layer may affect multiple aspects of a business model. Business modeling client 148 utilizes the matching information developed at block 310 to identify all the places in the business model that may be impacted by some business rule. For example, if a rule is about a user role in a fact type identified by a verb, then business modeling client 148 identifies any tasks with the same name as the verb and the same user role. Business modeling client 148 then marks the business model with marking information referencing the business rule that may affect that part of the business model. One marking technique that can be employed is to use UML stereotypes.

Alternatively or additionally, business modeling client 148 may transform rules entered at the Business Model layer into cardinality constraints on UML class associations, or into Object Constraint Language (OCL) statements. For example, the structural rule "Every order always has exactly one customer" may be mapped to a cardinality of '1' on the order-to-customer association. As another example, the behavioral rule "A customer may pay with a credit card only if the total cost of an order is more than $10" might be transformed to an OCL constraint such as:

context Order:: pay(creditCard): void
pre: totalCost>10.0

After the marking depicted at block 320, business modeling client 148 transforms the upper layer business model to obtain a lower layer implementation of the business model. In one embodiment, the transformation of the business model may be performed in accordance with U.S. Patent Application Publication No. US 2004/0249645 A1, which is incorporated herein by reference. As indicated in block 330, the transformation process includes generating additional code at each place in the model marked as being impacted by a business rule in order to implement the relevant business rule. The implementation code can include PSM-layer rules, configuration files, and/or other implementation artifacts as determined by the business rule. The specific implementation code that is generated will depend upon the nature of the target runtime platform, as well as the type (alethic or deontic) and formulation of each business rule.

For example, consider the necessity rule:
Every order always has exactly one customer.

In response to entry of this business rule, business modeling client 148 can automatically create the business item or UML class definitions for "order" and "customer" and the association between them. Alternatively, if the business model is already created, business modeling client 148 simply finds the business items or UML class definitions for "order" and "customer," and if necessary, creates a simple "has a" association between them. In the business item or UML class definition created for order, business modeling client 148 sets the cardinality of the customer reference according to the rule. In addition, business modeling client 148 finds tasks or actions that create orders or delete customers. For each task or action that creates an order, business modeling client 148 generates implementation code that initializes the order-to-customer relationship to reference the corresponding customer. Wherever the upper layer business model has an event that deletes a customer, business modeling client 148 generates code that checks whether any order references the customer and refuses the deletion if necessary. The implementation code to refuse the deletion may be implemented in several ways, including disabling (e.g., "graying out") a "delete this customer" button or aborting a delete operation and producing an error message.

Consider now the following exemplary restricted necessity rule:
It is necessary that a customer has at least one order only if the given customer has paid.

In response to entry of this business rule, business modeling client 148 can automatically create the business item or UML class definitions for "order" and "customer" and the association between them. Alternatively, if the business model is already created, business modeling client 148 simply finds the business items or UML class definitions for "order" and "customer," and if necessary, creates a simple "has a" association between them. In the business item or UML class definition created for order, business modeling client 148 sets the cardinality of the customer reference to zero or more according to the rule. The business modeling client 148 may also insert an OCL constraint (or equivalent) that captures the restriction ". . . only if the given customer has paid." In addition, business modeling client 148 finds marked tasks or actions in the business model that involve customers paying. For each task or action that involves a customer paying, business modeling client 148 converts the OCL constraint to implementation code that ensures that there is at least one order.

Now consider an exemplary possibility rule, such as:
It is possible that a customer has more than one order.

In response to entry of this business rule, business modeling client 148 can automatically create the business item or UML class definitions for "order" and "customer" and the association between them. Alternatively, if the business model is already created, business modeling client 148 simply finds the business items or UML class definitions for "order" and "customer," and if necessary, creates a simple "has a" association between them. In the business item or UML class definition created for order, business modeling client 148 sets the maximum cardinality of the order reference to zero or more according to the rule. Business modeling client 148 maintains the cardinality of the order reference when transforming the business items or class definitions.

Consider now an exemplary restricted possibility rule, for example:
It is possible that a customer has more than one order only if at most one order is open.

In response to entry of this business rule, business modeling client 148 can automatically create the business Item or UML class definitions for "order" and "customer" and the association between them. Alternatively, if the business model is already created, business modeling client 148 simply finds the business items or UML class definitions for "order" and "customer," and if necessary, creates a simple "has a" association between them. In the business item or UML class definition created for order, business modeling client 148 sets the maximum cardinality of the order reference to zero or more according to the rule. Business modeling client 148 maintains the cardinality of the order reference when transforming the business items or class definitions. Business modeling client 148 may also insert an OCL constraint (or equivalent) that captures the restriction that only one order may be open. In addition, business modeling client 148 locates marked portions of the business model having a task or action that creates an order. For each such marked task or action, business modeling client 148 converts the OCL constraint to code or lower-level rules that check whether the customer has any existing open orders, and if so, refuses the creation of a new order. Business modeling client 148 may implement refusal of the creation of a new order in any of a variety of ways, including disabling (e.g., "graying out") a "create an order" button or aborting a create operation and producing an error message.

Now consider the following exemplary impossibility rule:
An order never has more than one payment.

In response to entry of this business rule, business modeling client 148 can automatically create the business item or UML class definitions for "order" and "customer" and the association between them. Alternatively, if the business model is already created, business modeling client 148 simply finds the business items or UML class definitions for "order" and "customer," and if necessary, creates a simple "has a" association between them. In the business item or UML class definition created for order, business modeling client 148 sets the maximum cardinality of the payment reference to the range 0-1 according to the rule. Business modeling client 148 maintains the cardinality of the order reference when transforming the business items or class definitions. In addition, business modeling client 148 locates marked portions of the business model having a task or action that create payments for orders. For each such marked task or action, business modeling client 148 converts the OCL constraint to code or lower-level rules that check the corresponding order for a payment and refuses the creation of a new payment if one already exists. Business modeling client 148 may implement refusal of the creation of a new payment in any of a variety of ways, including disabling (e.g., "graying out") a "create a payment" button or aborting a create operation and producing an error message.

Consider now the following exemplary obligation rule:

A customer must pay for each order that is completed.

In response to entry of this business rule, business modeling client 148 evaluates the upper layer business model to determine where the rule applies and marks tasks (actions) where orders become complete. Business modeling client 148 may also insert an OCL constraint (or equivalent) that captures the obligation such as ". . . order that is completed." During transformation of the upper layer business model, business modeling client 148 generates implementation code at each location at which an order may enter the completed status that requires that the customer pay for the order before the order may enter the completed status. If an enforcement level is specified, business modeling client 148 also generates implementation code to apply the enforcement level if the rule is broken. For example, if the foregoing obligation rule has the associated enforcement level "order not shipped", business modeling client 148 generates implementation code that prevents shipping of the order either by disabling GUI features utilized to ship orders or aborting a shipping operation if payment has not been made.

As discussed above, the applicability of obligation rules can be restricted by casting a business rule as a restricted obligation rule, for example:

A customer must pay for each completed order if the customer is not a free prize winner.

In response to entry of this restricted obligation rule, business modeling client 148 evaluates the upper layer business model to determine where the rule applies and marks tasks (actions) where orders become complete. Business modeling client 148 may also insert an OCL constraint (or equivalent) that captures the restriction such as ". . . if the customer is not a free prize winner." During transformation of the upper layer business model, business modeling client 148 converts the OCL constraint to implementation code at each location at which an order may enter the completed status that requires that the customer pay for the order before the order may enter the completed status, but only if the customer is not a free prize winner. As above, if an enforcement level is specified, business modeling client 148 also generates implementation code to apply the enforcement level if the rule is broken.

Now consider an exemplary permission rules, such as:

A customer may pay with a credit card.

In response to entry of this business rule, business modeling client 148 marks tasks (actions) in the upper layer business model in which the customer pays for an order. For each such marked task or action, business modeling client 148 generates implementation code that during application runtime includes a credit card payment option wherever a customer pay action occurs.

As noted above, the application of such permission rules can be restricted through the implementation of a restricted permission rule, such as:

A customer may pay with a credit card only if the total cost of an order is more than $10.

In response to entry of this business rule, business modeling client 148 marks tasks (actions) in the upper layer business model in which the customer pays for an order. Business modeling client 148 may also insert an OCL constraint (or equivalent) that captures the restriction such as ". . . if the total cost of an order is more than $10." For each such marked task or action, business modeling client 148 generates implementation code each place a customer pay action occurs that tests whether the total cost of the order is greater than $10, and if so, includes a credit card payment option. If there is an enforcement level specified for the restricted permission rule, for example, "a supervisor may authorize a credit card payment of any amount", business modeling client 148 also generates implementation code enabling the specified enforcement level for the restricted permission rule, which in this case may be code configured to present an override dialog box requiring entry of a supervisor password prior to allowing credit card payment of an order amount of $10 or less.

Now consider the following exemplary prohibition rule:

A customer must not pay with a cash advance.

In response to entry of this business rule, business modeling client 148 marks tasks (actions) in the upper layer business model in which the customer pays for an order. Business modeling client 148 may also insert an OCL constraint (or equivalent) that captures the prohibition details such as ". . . pay with a cash advance." For each such marked task or action, business modeling client 148 generates implementation code each place a customer pay action occurs that tests whether the type of payment is cash advance, and if so, refuses the payment. If there is an enforcement level specified for the prohibition rule, for example, "a supervisor may authorize payment using a cash advance", business modeling client 148 also generates implementation code enabling the specified enforcement level, which in this case may be code configured to present an override dialog box requiring entry of a supervisor password prior to payment using a cash advance.

Business modeling client 148 also generates implementation code for computation rules specified for the upper layer business model. As an example, take the following computation rule:

Discount must be computed as 10% of the total.

In response to entry of this business rule, business modeling client 148 evaluates the upper layer business model to determine where the rule applies and marks tasks (actions) named "Compute Discount", where the term "discount" matches the term specified in the computation rule. Business modeling client 148 may also insert an OCL derivation rule (or equivalent) that captures the computation formula such as "10% of the total." During transformation of the upper layer business model, business modeling client 148 generates implementation code for each such task that applies the formula given in the rule.

For clarity, the previous examples describe support for a simple binary "has a" relationship. Similar function can be achieved for other relationships. For example, consider an SBVR fact type such as "professor awards grade to student". This is a three-way relationship among the terms professor, grade, and student. This can be converted to a UML three-way association class, and thence to code that implements the three-way relationship.

In a preferred embodiment of the present invention, the rule entry process of block 302 of FIG. 3A can be augmented to provide additional assistance to the user in creating an effective set of business rules in at least one mode of operation. FIG. 3B depicts a more detailed logical flowchart of rule entry process 302 according to this embodiment.

As depicted, the process begins at block 350 and then proceeds to block 352, which illustrates business modeling client 148 determining whether or not the user has entered a business rule. If not, the process iterates at block 352. In response to a determination at block 352 that a business rule has been entered, business modeling client 148 determines at block 354 whether a link can be established between the business rule and an upper layer business model, for example, by matching vocabulary between the business rule and the business model as described above with respect to block 310 of FIG. 3A. If not, the process ends at block 356. If, however, business modeling client 148 determines at block 354 that a link to the business model can be established, the process proceeds to block 358.

Block 358 depicts business modeling client 148 checking the proposed business rule and its vocabulary for inconsistency with the business model. As an example, assume that the user proposes the following business rule:

Every order always has exactly one customer.

Business modeling client 148 detects an inconsistency exists between this proposed business rule and a business model if the relationship in the model between order and customer is anything other than one.

If business modeling client 148 determines at block 372 that no inconsistency is found, the process proceeds to block 364, which is described below. If, on the other hand, business modeling client 148 determines at block 360 that an inconsistency is found between the proposed business rule and its vocabulary and the business model, business modeling client 148 presents the inconsistency to the user for correction at block 362. Thereafter, the process passes to block 364.

Block 364 depicts business modeling client 148 determining and presenting to the user an explanatory message describing the impact of the proposed business rule on the business process described by the business model. For example, assume the user enters the business rule:

Every order always has exactly one customer.

In response, business modeling client 148 describes the impact of the business rule on the business model, for example, by displaying the following textual messages:

A customer must be associated each time an order is created; and

A customer may not be deleted if an order exists for that customer

Business modeling client 148 then prompts the user at block 366 to affirm entry of the proposed business rule in light of the impact the proposed business rule will have on the business model. If business modeling client 148 determines at block 366 that the user affirms entry of the business rule, the process proceeds to block 370, which illustrates business modeling client 148 adding the proposed business rule to the rule set for the business model. If, on the other hand, business modeling tool 148 determines at block 366 that the user does not affirm entry of the proposed business rule, entry of the rule is aborted at block 368. Following either of blocks 368 or 370, the process returns to block 352, which has been described.

A further enhancement to the method of implementing business rules disclosed herein is to enable user designation of selected rules and vocabulary entered at block 302 of FIG. 3A as volatile, meaning that the rules and vocabulary so designated are dynamically configurable at runtime. In a preferred embodiment, business modeling client 148 supports such volatility by allowing the user to designate vocabulary entries (e.g., noun concepts and fact types) or rules as volatile, for example, using structured human language or via a component of a graphical user interface. Of course, it is desirable if the user designates as volatile only the rules and vocabulary pertaining to aspects of the business, such as approval thresholds, sale discount amounts, and web page advertising ("personalisation"), that are expected to change frequently. Distinguishing between volatile and non-volatile rules and vocabulary in this manner adds expressive power to the business model, and enables the transformations performed by business modeling client 148 to preferentially exploit runtime mechanisms that support the volatility where required, while utilizing other mechanisms that have better performance or other characteristics for non-volatile rules and/or vocabulary.

With respect to the volatility of rules, it should be recalled from the foregoing discussion that business rules can generally be classified as either alethic or deontic. Alethic business rules, also referred to as structural or definitional business rules, state what is necessary or possible or impossible. Deontic (also called operative or behavioral) business rules state what is obligatory or permitted or prohibited and may have associated enforcement levels.

Because alethic business rules are foundational to a business model and define the business environment represented by the business model, it a preferred if alethic rules are constrained by business modeling client 148 to be non-volatile. Deontic rules, on the other hand, may be volatile in whole or in part or non-volatile.

As discussed above, the business vocabulary utilized to compose business rules includes, inter alia, noun concepts and fact types, either of which may be volatile or non-volatile. It should be noted that business vocabulary can be volatile independent of any business rules. For example, the text of an error message or the heading in a report might be volatile because it needs to change in a runtime system.

As an example of volatile business vocabulary entries, consider the following exemplary rules:

Every purchase request over a $ threshold must be approved by the requester's manager.

The initial threshold is $250.

These business rules may be paired with a business model representing a process for handling purchase requests. In that process, the $250 threshold may need to be adjusted from time to time. In this case, the business rule may include an indication that the threshold value is volatile. The indication distinguishes aspects of the rule that may use implementation technology that is relatively hard to change (e.g., Java code used to perform the threshold test within a flow) from an aspect (the $250 value) that must be easier to change in order to satisfy the business need.

The indication of the volatility of the threshold value might range widely from assigning a special property to the threshold value via the graphical user interface of business modeling tool 148 to a special keyword in a rule language. As a specific example, the structured human language that is utilized to enter business rules at block 302 of FIG. 3A can be extended with a new fact type as follows:

concept is volatile where "concept" is a noun concept, fact type or relationship defined in the business vocabulary that can be marked as volatile. With this structured language extension, the exemplary business rules set forth above can be recast as:

A purchase request must be approved if the amount of the given purchase request is greater than the approval threshold.

approval threshold

Concept Type: integer approval threshold is volatile

Such business rules can then be transformed automatically into implementation code in accordance with the process described above with reference to block 330 of FIG. 3A. In the implementation code, the volatile attribute indicates that the threshold value should be realized so that it may be more easily modified in the runtime system than hard coded non-volatile aspects of the model. For example, the threshold value may be specified in property or configuration files, deployment descriptors, or runtime rules systems. The implemented business system may further advantageously incorporate a user interface intended to facilitate modification of the threshold value. For example, business modeling client 148 may generate implementation code at block 330 that causes the business system to present a dialog box 380 as shown in FIG. 3C during an initial configuration and at subsequent intervals (e.g., daily, weekly, or monthly, etc.) or on demand.

Figure 3C:
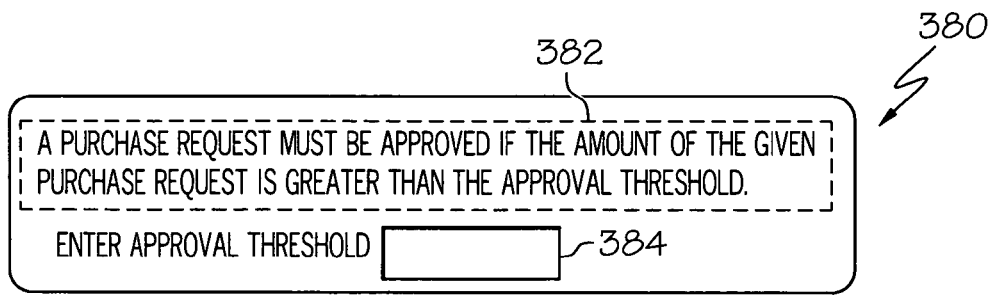
FIG. 3C depicts a first exemplary graphical user interface presented to a user at runtime to configure a vocabulary entry business model.

As depicted in FIG. 3C, business modeling client 148 generates the textual prompt 382 presented within dialog box 380 directly from the original business rule, substituting an input field 384 for the volatile component. Business modeling client 148 is further configured to generate implementation code to validate any user input in input field 384 as an integer value (and to produce an appropriate error message if otherwise) based upon the declaration of the approval threshold as being of the type integer in the business rules.

Business modeling client 148 supports multiple business rules referencing a single volatile rule component. For example, consider the following set of business rules:

A purchase request must be approved if the amount of the given purchase request is greater than the approval threshold.

A purchase request over the approval threshold must get priority handling.

The requester of a purchase request over the approval threshold that is not approved must be notified.

Approval threshold

Concept Type: integer

Approval threshold is volatile

Figure 3D:
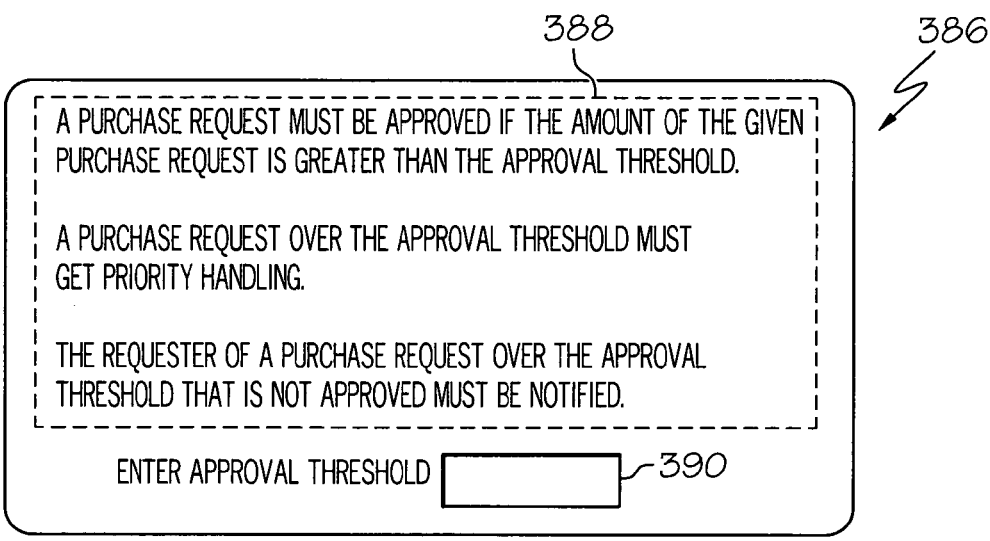
FIG. 3D illustrates a second exemplary graphical user interface presented to a user at runtime to configure a vocabulary entry of a business model.

In response to entry of this set of business rules, business modeling client 148 may generate implementation code to present dialog box 386 of FIG. 3D to the user. As described above, business modeling client 148 generates the textual prompt 388 presented within dialog box 386 directly from the original business rules, substituting an input field 390 for the volatile component. Business modeling client 148 is further configured to generate implementation code to validate any user input in input field 390 as an integer value (and to produce an appropriate error message if otherwise) based upon the declaration of the approval threshold as being of the type integer in the business rules.

The previous examples illustrated application of volatility to a vocabulary entry, such as a threshold value. In some business environments, it is desirable to have the flexibility to change one or more entire business rules rather than merely one or more vocabulary entries. For example, a business may anticipate wholesale changes to its purchase request approval criteria. Business rules that express this volatility in a structured human language can be given as follows:

A purchase request must gain approval according to the approval criteria.

Approval criteria is decided by amount of purchase request is greater than $250 or requester of purchase request is not a manager.

Approval criteria is volatile

The first business rule defines the relationship between purchase requests, approvals, and the approval criteria. The second business rule gives two initial approval criteria. The third business rule indicates that the criteria—taken as a whole—may change over time.

Figure 3E:
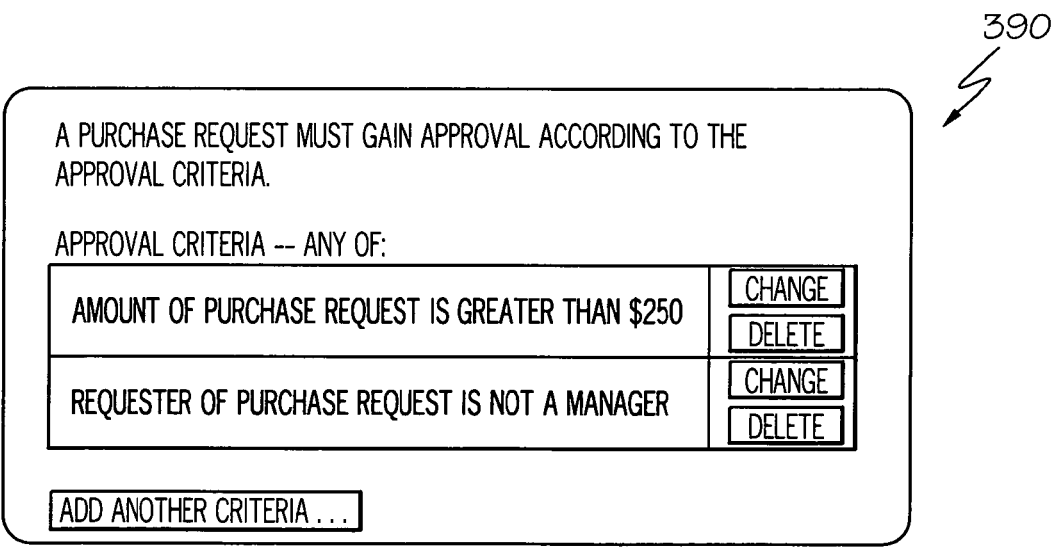
FIG. 3E depicts a third exemplary graphical user interface presented to a user at runtime to configure a business rule of a business model.

Given this input, business modeling client 148 converts the requirement for purchase request approval to one or more tasks in the business model. Because the approval criteria is designated as volatile, indicating that the approval criteria should be relatively easy to change, business modeling client 148 may advantageously transform the business rules into a runtime rules technology, such as JESS, the rule engine for Java. To facilitate modification to the approval criteria, business modeling client 148 may be configured to present an associated configuration interface such as dialog box 390 of FIG. 3E. As shown in FIG. 3E, dialog box 390 presents the existing approval criteria specified within the business rules in a tabular format that enable a user to add, delete, or change the individual approval criteria at runtime.

While the preceding examples assume that business rules and vocabulary entries are non-volatile by default, those skilled in the art will appreciate that business modeling tool 148 can alternatively apply volatility to business rules by default. In this case, a fact type can be designated as non-volatile as follows:

Concept is non-volatile.

As has been described, the present invention provides an improved method, system and program product for implementing business rules. According to the present invention, business rules are defined at an upper layer of a business model hierarchy and then linked to an upper layer business model. When the upper layer business model is transformed to a lower layer implementation-oriented model, the business rules are also transformed into implementation code. In at least one embodiment, at least some of the business vocabulary entries from which the business rules are constructed and/or one or more business rules are designated as volatile, such that the implementation code facilitates runtime modification of the volatile rules and/or vocabulary entries.

The advantages of this methodology of implementing business rules are manifold. First, business persons are enabled to define business rules in that more familiar structured natural human language rather than mathematical or logical constructs. Second, a business rule applies broadly to the business model in general, rather than to a particular step in a business process. Consequently, each business rule may potentially spawn numerous PIM or PSM rules to implement the business rule. Third, because the business rule is linked to an upper layer business model, the definition of a business rule promotes uniformity of business regulations, guidelines, and policies and enables automated validation, testing, and transformations. Fourth, because certain vocabulary items referenced in the rules are shared with the business model, model-driven transformations can automatically convert the business rules into execution steps inserted within IT specifications generated by the transformations. Fifth, linking the business rules to an upper layer business model enables a tool to produce explanatory messages that indicates the impact of the business rules on the modeled business processes. Sixth, the present methodology permits vocabulary entries within business rules or entire business rules to be designated as volatile, enabling automatic generation of runtime code supporting such volatility.

It should be understood that at least some aspects of the present invention may alternatively be implemented in a computer-useable medium that contains a program product. Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), system memory such as but not limited to Random Access Memory (RAM), and communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

Software Deployment

Thus, the method described herein, and in particular as shown and described with respect to FIGS. 3A-3B, can be deployed as a process software from service provider server 202 to client computer 102.

Figure 6A:
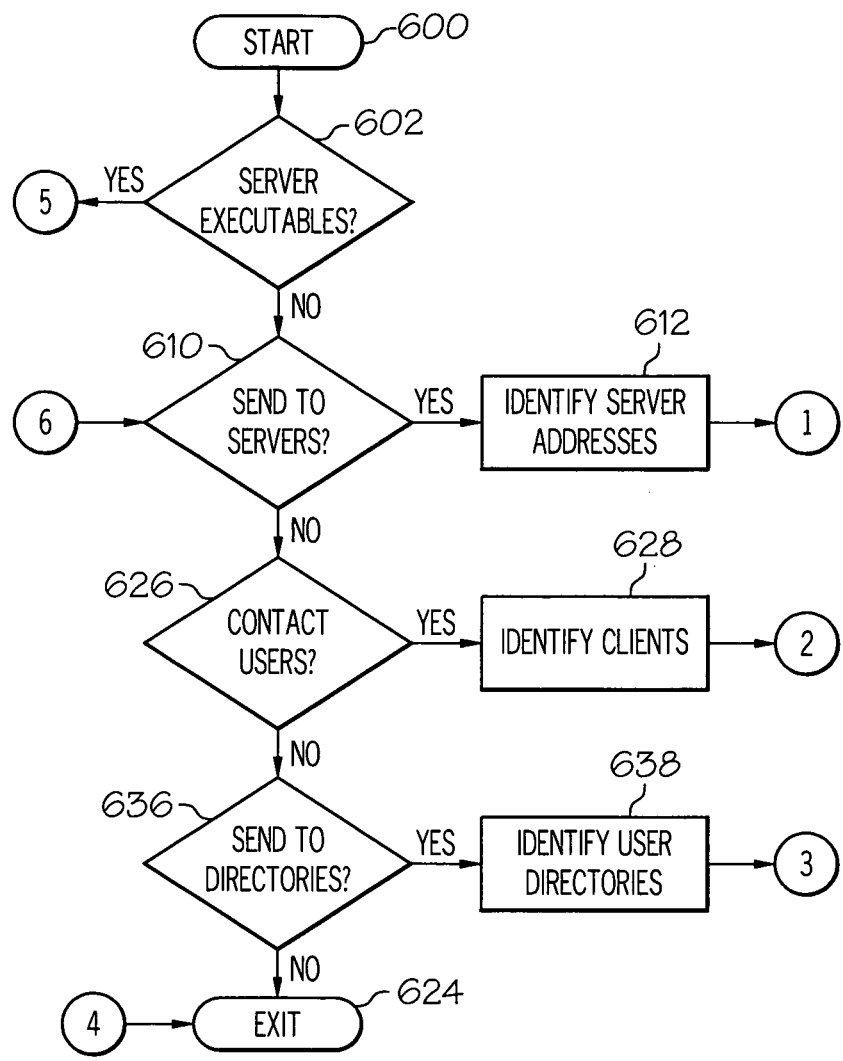
FIGS. 6A-6B show a flowchart of steps taken to deploy software capable of executing the steps shown and described in FIGS. 3A-3B.
Figure 6B:
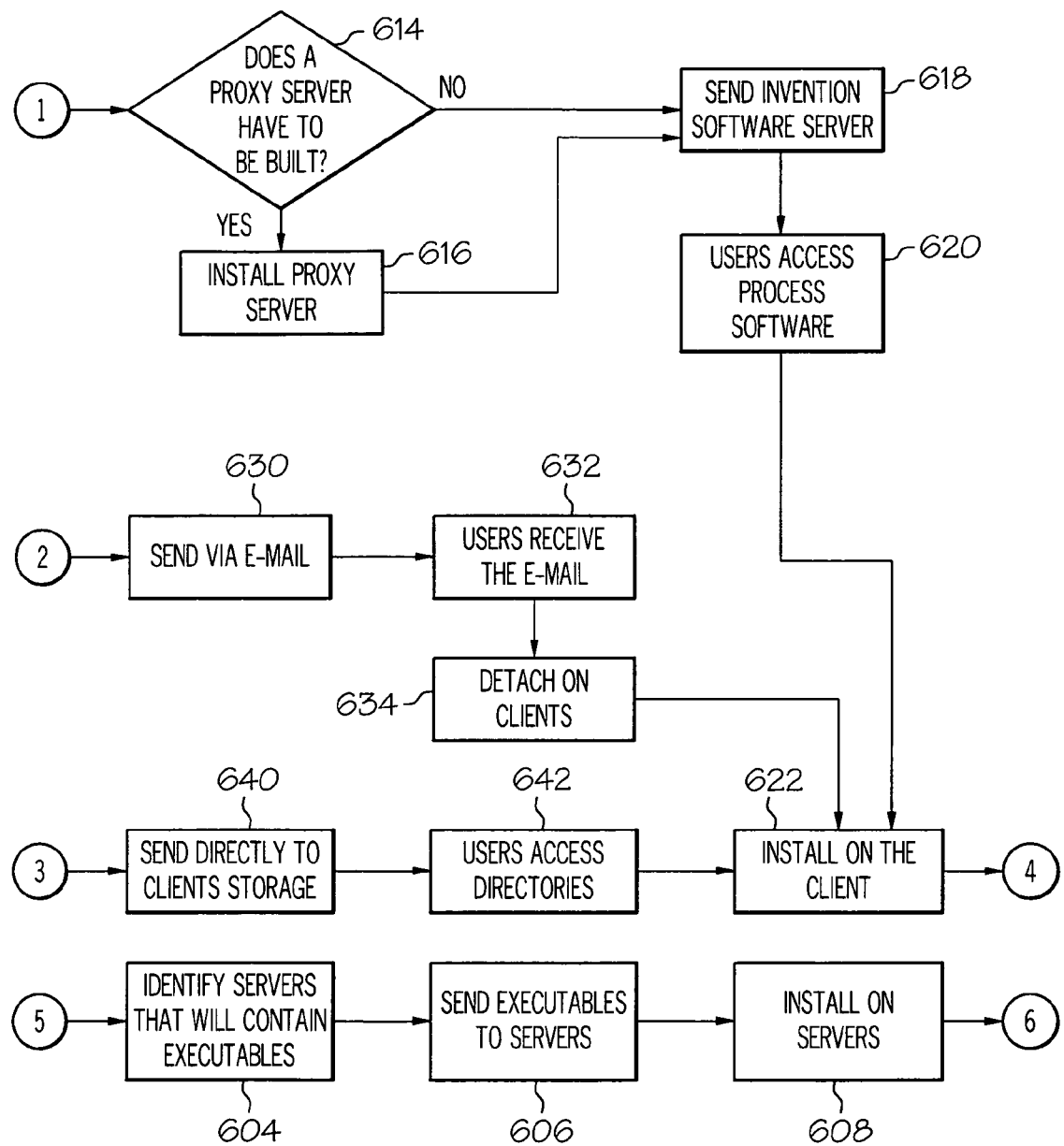

Referring then to FIG. 6, step 600 begins the deployment of the process software. The first thing is to determine if there are any programs that will reside on a server or servers when the process software is executed (query block 602). If this is the case, then the servers that will contain the executables are identified (block 604). The process software for the server or servers is transferred directly to the servers' storage via File Transfer Protocol (FTP) or some other protocol or by copying though the use of a shared file system (block 606). The process software is then installed on the servers (block 608).

Next, a determination is made on whether the process software is to be deployed by having users access the process software on a server or servers (query block 610). If the users are to access the process software on servers, then the server addresses that will store the process software are identified (block 612).

A determination is made if a proxy server is to be built (query block 614) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (block 616). The process software is sent to the servers either via a protocol such as FTP or it is copied directly from the source files to the server files via file sharing (block 618). Another embodiment would be to send a transaction to the servers that contained the process software and have the server process the transaction, then receive and copy the process software to the server's file system. Once the process software is stored at the servers, the users, via their client computers, then access the process software on the servers and copy to their client computers file systems (block 620). Another embodiment is to have the servers automatically copy the process software to each client and then run the installation program for the process software at each client computer. The user executes the program that installs the process software on his client computer (block 622) then exits the process (terminator block 624).

In query step 626, a determination is made whether the process software is to be deployed by sending the process software to users via e-mail. The set of users where the process software will be deployed are identified together with the addresses of the user client computers (block 628). The process software is sent via e-mail to each of the users' client computers (block 630). The users then receive the e-mail (block 632) and then detach the process software from the e-mail to a directory on their client computers (block 634). The user executes the program that installs the process software on his client computer (block 622) then exits the process (terminator block 624).

Lastly a determination is made on whether to the process software will be sent directly to user directories on their client computers (query block 636). If so, the user directories are identified (block 638). The process software is transferred directly to the user's client computer directory (block 640). This can be done in several ways such as, but not limited to, sharing of the file system directories and then copying from the sender's file system to the recipient user's file system or alternatively using a transfer protocol such as File Transfer Protocol (FTP). The users access the directories on their client file systems in preparation for installing the process software (block 642). The user executes the program that installs the process software on his client computer (block 622) and then exits the process (terminator block 624).

VPN Deployment

The present software can be deployed to third parties as part of a service wherein a third party VPN service is offered as a secure deployment vehicle or wherein a VPN is built on-demand as required for a specific deployment.

A virtual private network (VPN) is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-bee number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a company's multiple fixed sites over a public network such as the Internet.

The process software is transported over the VPN via tunneling which is the process of placing an entire packet within another packet and sending it over a network. The protocol of the outer packet is understood by the network and both points, called tunnel interfaces, where the packet enters and exits the network.

Software Integration

The process software which consists code for implementing the process described herein may be integrated into a client, server and network environment by providing for the process software to coexist with applications, operating systems and network operating systems software and then installing the process software on the clients and servers in the environment where the process software will function.

The first step is to identify any software on the clients and servers including the network operating system where the process software will be deployed that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists matches the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

On Demand

The process software is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 7A:
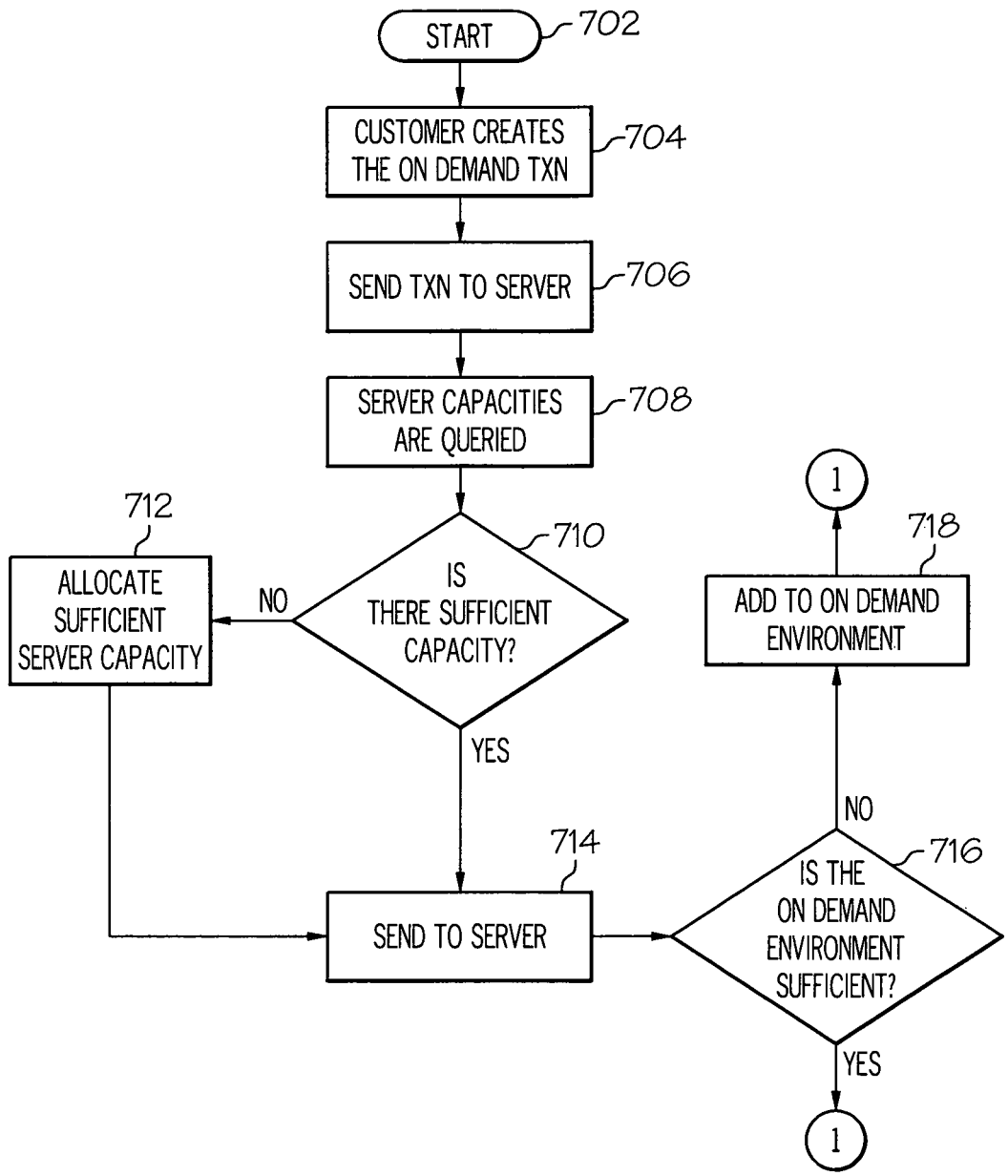
FIGS. 7A-7B show a flowchart showing steps taken to execute the steps shown and described in FIGS. 3A-3B using an on-demand service provider.
Figure 7B:
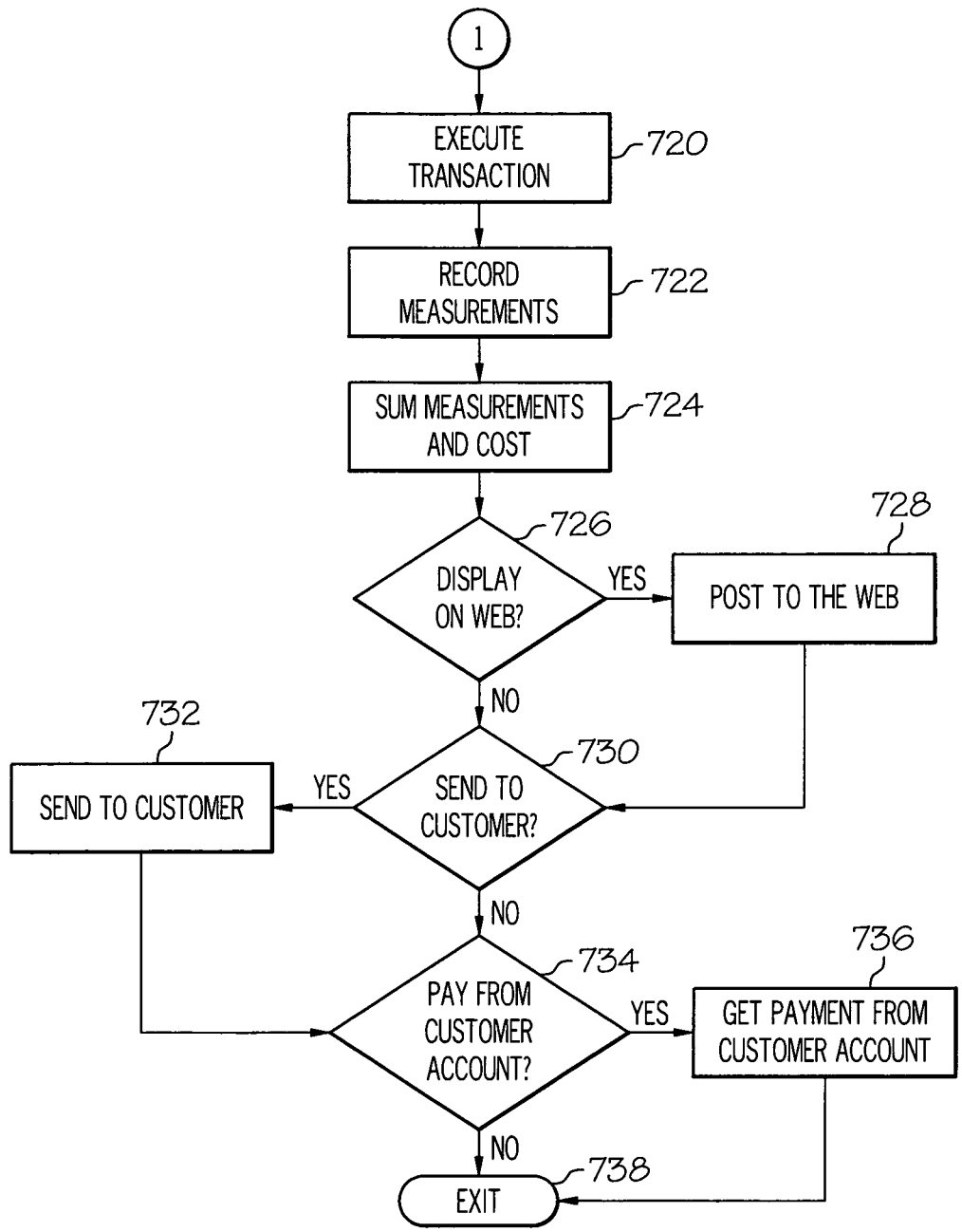

With reference now to FIG. 7, initiator block 702 begins the On Demand process. A transaction is created than contains the unique customer identification, the requested service type and any service parameters that further, specify the type of service (block 704). The transaction is then sent to the main server (block 706). In an On Demand environment the main server can initially be the only server, then as capacity is consumed other servers are added to the On Demand environment.

The server central processing unit (CPU) capacities in the On Demand environment are queried (block 708). The CPU requirement of the transaction is estimated, then the servers available CPU capacity in the On Demand environment are compared to the transaction CPU requirement to see if there is sufficient CPU available capacity in any server to process the transaction (query block 710). If there is not sufficient server CPU available capacity, then additional server CPU capacity is allocated to process the transaction (block 712). If there was already sufficient available CPU capacity then the transaction is sent to a selected server (block 714).

Before executing the transaction, a check is made of the remaining On Demand environment to determine if the environment has sufficient available capacity for processing the transaction. This environment capacity consists of such things as but not limited to network bandwidth, processor memory, storage etc. (block 716). If there is not sufficient available capacity, then capacity will be added to the On Demand environment (block 718). Next the required software to process the transaction is accessed, loaded into memory, then the transaction is executed (block 720).

The usage measurements are recorded (block 722). The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (block 724).

If the customer has requested that the On Demand costs be posted to a web site (query block 726), then they are posted (block 728). If the customer has requested that the On Demand costs be sent via e-mail to a customer address (query block 730), then these costs are sent to the customer (block 732). If the customer has requested that the On Demand costs be paid directly from a customer account (query block 734), then payment is received directly from the customer account (block 736). The On Demand process is then exited at terminator block 738.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

What is claimed is:

1. A method, comprising:
   receiving, from a data store, an upper layer business model;
   receiving, from a user via a computer input device, business rules for the upper layer business model;
   designating at least a portion of a particular business rule among the business rules as volatile, run-time configurable;
   transforming the upper layer business model, using business vocabulary in the business rules, to create implementation code; and
   dynamically configuring, using a computer hardware device and during runtime, the at least the portion of the particular business rule designated as volatile.

2. The method of claim 1, wherein
   the computer input device includes a user interface through which the user identifies the upper level business model.

3. The method of claim 1, wherein
   all of the particular business rule is designated as volatile.

4. The method of claim 1, wherein
   the designated business rule is a deontic rule.

5. The method of claim 1, wherein
   the business rules express at least one of a set of modalities consisting of necessity, possibility, impossibility, obligation, permission, and prohibition.

6. The method of claim 1, wherein
   the business rules are received using structured human language.

7. The method of claim 1, wherein
   the at least the portion of the particular business rule comprises a noun concept.

8. The method of claim 1, wherein
   the at least the portion of the particular business rule comprises a fact type.

9. The method of claim 1, wherein
   the implementation code presents, to the user, a user interface enabled to configure the at least the portion of the particular business rule.

10. The method of claim 9, wherein
    the implementation code validates configuration input received at runtime from the user interface.

11. A computer hardware system, comprising:
    a data store
    at processor, the processor is configured to
      receive an upper layer business model;
      receive, from a user, business rules for the upper layer business model;
      designate at least a portion of a particular business rule among the business rules as volatile, run-time configurable;
      transform the upper layer business model, using business vocabulary in the business rules, to create implementation code; and
      dynamically configure, during runtime, the at least the portion of the particular business rule designated as volatile.

12. The system of claim 11, wherein
    the computer hardware system includes a user interface through which the user identifies the upper level business model.

13. The system of claim 11, wherein
    all of the particular business rule is designated as volatile.

14. The system of claim 11, wherein
    the designated business rule is a deontic rule.

15. The system of claim 11, wherein
    the business rules express at least one of a set of modalities consisting of necessity, possibility, impossibility, obligation, permission, and prohibition.

16. The system of claim 11, wherein
    the business rules are received using structured human language.

17. The system of claim 11, wherein
    the at least the portion of the particular business rule comprises a noun concept.

18. The system of claim 11, wherein
    the at least the portion of the particular business rule comprises a fact type.

19. The system of claim 11, wherein
    the implementation code presents, to the user, a user interface enabled to configure the at least the portion of the particular business rule.

20. The system of claim 19, wherein
    the implementation code validates configuration input received at runtime from the user interface.

21. A computer program product comprising computer usable storage medium having stored therein computer usable program code, the computer usable program code, which when executed by a computer hardware system, causes the computer hardware system to perform:
    receiving, from a data store, an upper layer business model;
    receiving, from a user via a computer input device, business rules for the upper layer business model;
    designating at least a portion of a particular business rule among the business rules as volatile, run-time configurable;
    transforming the upper layer business model, using business vocabulary in the business rules, to create implementation code; and
    dynamically configuring, using a computer hardware device and during runtime, the at least the portion of the particular business rule designated as volatile.

22. The computer program product of claim 21, wherein
    the computer input device includes a user interface through which the user identifies the upper level business model.

23. The computer program product of claim 21, wherein
    all of the particular business rule is designated as volatile.

24. The computer program product of claim 21, wherein
    the designated business rule is a deontic rule.

25. The computer program product of claim 21, wherein
    the business rules express at least one of a set of modalities consisting of necessity, possibility, impossibility, obligation, permission, and prohibition.

26. The computer program product of claim 21, wherein
    the business rules are received using structured human language.

27. The computer program product of claim 21, wherein
    the at least the portion of the particular business rule comprises a noun concept.

28. The computer program product of claim 21, wherein
    the at least the portion of the particular business rule comprises a fact type.

29. The computer program product of claim 21, wherein
    the implementation code presents, to the user, a user interface enabled to configure the at least the portion of the particular business rule.

30. The computer program product of claim 29, wherein
    the implementation code validates configuration input received at runtime from the user interface.

* * * * *